United States Patent
Kawano et al.

(10) Patent No.: US 9,583,949 B2
(45) Date of Patent: Feb. 28, 2017

(54) POWER RECEIVING APPARATUS AND POWER TRANSMISSION SYSTEM

(71) Applicant: FUJITSU LIMITED, Kawasaki-shi, Kanagawa (JP)

(72) Inventors: Hiroyasu Kawano, Ebina (JP); Akiyoshi Uchida, Akashi (JP); Kazuyuki Ozaki, Machida (JP)

(73) Assignee: FUJITSU LIMITED, Kawasaki (JP)

( * ) Notice: Subject to any disclaimer, the term of this patent is extended or adjusted under 35 U.S.C. 154(b) by 386 days.

(21) Appl. No.: 14/445,913

(22) Filed: Jul. 29, 2014

(65) Prior Publication Data

US 2014/0333152 A1  Nov. 13, 2014

Related U.S. Application Data

(63) Continuation of application No. PCT/JP2012/052163, filed on Jan. 31, 2012.

(51) Int. Cl.
*H02J 5/00* (2016.01)
*H02J 17/00* (2006.01)

(52) U.S. Cl.
CPC .............. *H02J 5/005* (2013.01); *H02J 17/00* (2013.01)

(58) Field of Classification Search
CPC .............. H02J 17/00; H02J 5/005; H02J 7/025
USPC ........................................................ 307/104
See application file for complete search history.

(56) References Cited

U.S. PATENT DOCUMENTS

| 8,508,184 B2 | 8/2013 | Sakakibara et al. |
| 2014/0097671 A1* | 4/2014 | Nakamura ................ B60L 3/04 307/9.1 |

FOREIGN PATENT DOCUMENTS

| JP | 2004-260917 | 9/2004 |
| JP | 2007208201 A * | 8/2007 |
| JP | 2010-193701 | 9/2010 |
| JP | 2011-234496 | 11/2011 |

OTHER PUBLICATIONS

International Search Report of Int. Appl. No. PCT/JP2012/052163 dated Oct. 23, 2012 (1 page).

* cited by examiner

*Primary Examiner* — Erica Lin
*Assistant Examiner* — Fan He
(74) *Attorney, Agent, or Firm* — Fujitsu Patent Center

(57) ABSTRACT

A power receiving apparatus includes a power reception circuit, a first member having a cylindrical shape, a power receiving coil disposed on a cylinder side surface of the first member and connected through wires to the power reception circuit, and a resonance coil configured to be freely movable along the cylinder side surface in a circumferential direction around a cylinder center axis of the first member, wherein the power receiving coil and the resonance coil are coupled to each other through electromagnetic induction.

10 Claims, 25 Drawing Sheets

POWER RECEIVING APPARATUS AND POWER TRANSMISSION SYSTEM

CROSS-REFERENCE TO RELATED APPLICATIONS

This application is a continuation application of International Application PCT/JP2012/052163 filed on Jan. 31, 2012 and designated the U.S., the entire contents of which are incorporated herein by reference.

FIELD

The disclosures herein generally relate to power supply systems, and particularly relate to a wireless power supply system that wirelessly supplies electric power.

BACKGROUND

Wireless power transmission technology that transmits electric power between two points in space without use of a power transmission cable includes a magnetic resonance power transmission technology that uses magnetic resonance to transmit power. In the magnetic resonance power transmission system, a coil (i.e., LC resonance coil) having a resonance function based on capacitor and inductor is provided on each of the transmission side and the reception side. The LC resonance coil provided on the transmission side and the LC resonance coil provided on the reception side have a common resonance frequency. Electric power is transmitted from the transmission side to the reception side via a high-frequency alternating-current magnetic field that oscillates at this resonance frequency.

The magnetic resonance power transmission system allows longer power transmission distance (i.e., distance in the direction perpendicular to the coil plane) and a wider margin for the position of a power receiving side (i.e., greater tolerance to a displacement in the direction parallel to the coil plane) than the wireless power transmission system that uses electromagnetic induction without utilizing resonance. Further, highly efficient power transmission is achieved between coils having different sizes.

Wireless electric charge systems that use electromagnetic induction without utilizing resonance are used in chargers for rechargeable batteries, and have already been commercially available. Such chargers require exact positional alignment between the power-transmission-side coil and the power-reception-side coil in order to transmit power through electromagnetic induction. For example, a rechargeable battery may be placed with respect to a recess of a charger such that the negative pole of the rechargeable battery faces the bottom surface of the recess, thereby achieving exact positional alignment. There may be a case, however, where a plurality of batteries may need to be charged. Aligning the individual batteries with respect to the respective recesses of a charger in the manner as described above is quite cumbersome.

The use of magnetic resonance in place of electromagnetic induction allows efficient wireless electric charge without exact positional alignment relative to a charger. In the case of charging a plurality of batteries at once, the use of electromagnetic induction may require that a plurality of power transmitting coils be provided for the respective batteries. The use of magnetic resonance, on the other hand, allows a single large power transmitting coil to efficiently transmit power to a plurality of power receiving coils for electric charge.

A typical shape of a rechargeable battery is a cylinder. In order to secure a large power receiving area size, it is preferable to provide the power receiving coil on the side surface of the rechargeable battery. Further, in order to charge a plurality of rechargeable batteries without requiring these batteries to be placed in specific position and/or at specific spatial locations, a large power transmitting coil may be disposed across the entirety of a charger platform that is placed in a horizontal position. Rechargeable batteries may then be laid horizontally on the surface of the charger platform. In this arrangement, efficient power reception may be achieved when the power transmitting coil embedded in the charger platform and the power receiving coil embedded in a rechargeable battery substantially face each other. With a power receiving coil situated at a specific position on the lateral surface of a rechargeable battery, however, the fact that cylindrical rechargeable battery is easy to rotate makes it difficult to keep the battery still in such a position that the power receiving coil and the power transmitting coil face each other.

[Patent Document 1] Japanese Laid-open Patent Publication No. 2010-193701

[Patent Document 2] Japanese Laid-open Patent Publication No. 2004-260917

SUMMARY

According to an aspect of the embodiment, a power receiving apparatus includes a power reception circuit, a first member having a cylindrical shape, a power receiving coil disposed on a cylinder side surface of the first member and connected through wires to the power reception circuit, and a resonance coil configured to be freely movable along the cylinder side surface in a circumferential direction around a cylinder center axis of the first member, wherein the power receiving coil and the resonance coil are coupled to each other through electromagnetic induction.

According to an aspect of the embodiment, a power transmission system includes a power transmitting apparatus, and a power receiving apparatus configured to receive power from the power transmitting apparatus via magnetic resonance, wherein the power receiving apparatus includes a power reception circuit, a first member having a cylindrical shape, a power receiving coil disposed on a cylinder side surface of the first member and connected through wires to the power reception circuit, and a resonance coil configured to be freely movable along the cylinder side surface in a circumferential direction around a cylinder center axis of the first member, wherein the power receiving coil and the resonance coil are coupled to each other through electromagnetic induction.

The object and advantages of the embodiment will be realized and attained by means of the elements and combinations particularly pointed out in the claims. It is to be understood that both the foregoing general description and the following detailed description are exemplary and explanatory and are not restrictive of the invention, as claimed.

DESCRIPTION OF EMBODIMENTS

In the following, embodiments of the invention will be described with reference to the accompanying drawings. In these drawings, the same or corresponding elements are referred to by the same or corresponding numerals, and a description thereof will be omitted as appropriate.

Figure 1:
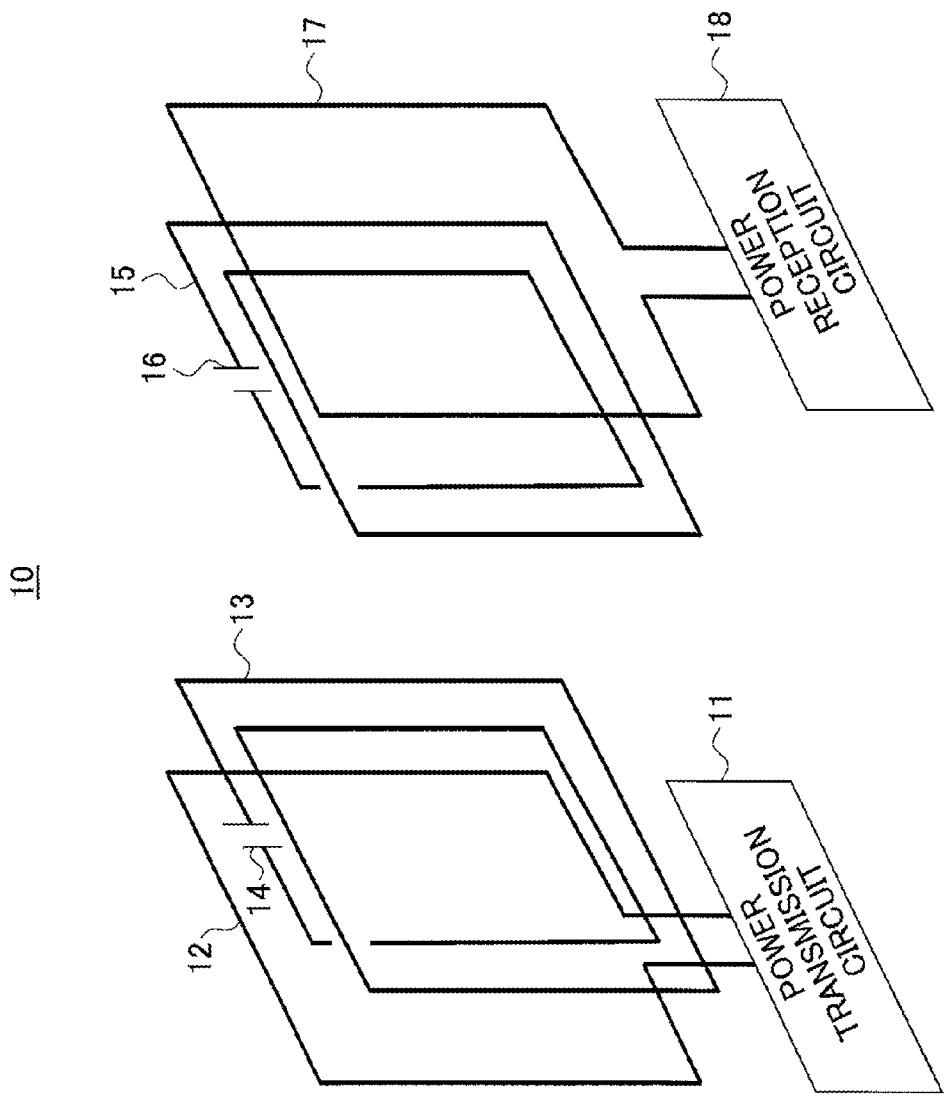
FIG. 1 is a drawing illustrating an example of the configuration of a magnetic resonance power transmission system.

FIG. 1 is a drawing illustrating an example of the configuration of a magnetic resonance power transmission system. A power transmission system 10 illustrated in FIG. 1 include a power transmission circuit 11, a power transmitting coil 12, a resonance coil 13, a capacitor 14, a resonance coil 15, a capacitor 16, a power receiving coil 17, and a power reception circuit 18. The power transmission circuit 11, the power transmitting coil 12, the resonance coil 13, and the capacitor 14 correspond to a power transmitter. The resonance coil 15, the capacitor 16, the power receiving coil 17, and the power reception circuit 18 correspond to a power receiver.

The power transmission circuit 11 generates alternating-current power that oscillates at desired oscillating frequency. The power transmitting coil 12 is connected through wires to the power transmission circuit 11. The power transmission circuit 11 supplies alternating-current power having the above-noted oscillating frequency to the power transmitting coil 12 via wire connections. The power transmitting coil 12 is coupled with the resonance coil 13 via electromagnetic induction to supply power to the resonance coil 13.

The resonance coil 13 is coupled to the capacitor 14, so that the resonance coil 13 and the capacitor 14 serve as a resonance circuit. The resonance coil 15 is coupled to the capacitor 16, so that the resonance coil 15 and the capacitor 16 serve as a resonance circuit. These resonance circuits may have common resonance frequency. The power transmission circuit 11 may supply alternating-current power having this resonance frequency to the power transmitting coil 12. In the example illustrated in FIG. 1, each capacitor coupled to a coil is illustrated as a condenser (i.e., capacitor element), but is not limited to such a configuration. Each capacitor may be the stray capacitance of a corresponding coil. The number of windings of each coil is not limited to a particular number. The number of windings of each coil may be one, or may be more than one. Each coil may be a helical coil or a spiral coil. It may be preferable for the coil on the reception side to be substantially planar as will be described later.

Electric current flowing through the resonance coil 13 oscillates at the resonance frequency. This causes, through magnetic coupling, electric current oscillating at the resonance frequency to appear in the resonance coil 15 having the same resonance frequency. Both the resonance circuit including the resonance coil 13 and the resonance circuit including the resonance coil 15 oscillate, so that large electric current flows through these resonance circuits, thereby effecting efficient power transmission from the power transmission side to the power reception side. Namely, power is transmitted through magnetic resonance from the resonance coil 13 to the resonance coil 15.

The resonance coil 15 is coupled with the power receiving coil 17 via electromagnetic induction to supply alternating-current power to the power receiving coil 17. The power receiving coil 17 is connected through wires to the power reception circuit 18. The power receiving coil 17 supplies the alternating-current power to the power reception circuit 18 via wire connections. The power reception circuit 18 rectifies the alternating-current power to generate a direct-current voltage, which is supplied to a load such as a battery.

Figure 2:
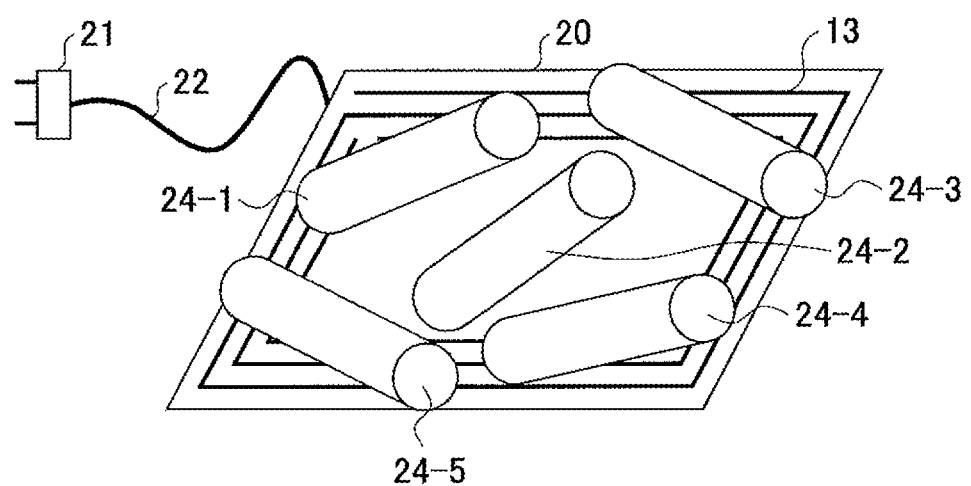
FIG. 2 is a drawing illustrating an example of an embodiment of the power transmission system.

FIG. 2 is a drawing illustrating an example of an embodiment of the power transmission system. The power transmission system illustrated in FIG. 2 includes a power transmitter 20, a plug 21, an electrical cord 22, and rechargeable batteries 24-1 through 24-5 which include power receivers. The power transmission system charges the rechargeable batteries 24-1 through 24-5 via magnetic resonance. The plug 21 is plugged into an outlet that provides commercial power supply, and supplies power to the power transmitter 20 through the electrical cord 22. The power transmitter 20 having a plate shape includes a resonance coil 13 that is disposed on the plate surface to cover the entirety thereof. The resonance coil 13 corresponds to the resonance coil 13 illustrated in FIG. 1. The resonance coil 13 receives alternating-current power from the oscillator and coil (corresponding to the power transmission circuit 11 and the power transmitting coil 12 illustrated in FIG. 1) embedded in the power transmitter 20.

Each of the rechargeable batteries 24-1 through 24-5 includes circuit components corresponding to the resonance coil 15, the capacitor 16, the power receiving coil 17, and the power reception circuit 18 illustrated in FIG. 1. In each of the rechargeable batteries 24-1 through 24-5, the resonance coil thereof receives power from the resonance coil 13 of the power transmitter 20 through magnetic resonance. During the charge operation, it may suffice for each of the cylindrical rechargeable batteries 24-1 through 24-5 to be placed horizontally on the plane surface of the power transmitter 20. There are no specific requirements for the horizontal direction and vertical direction (i.e., role angle) in which each battery is placed.

Figure 3:
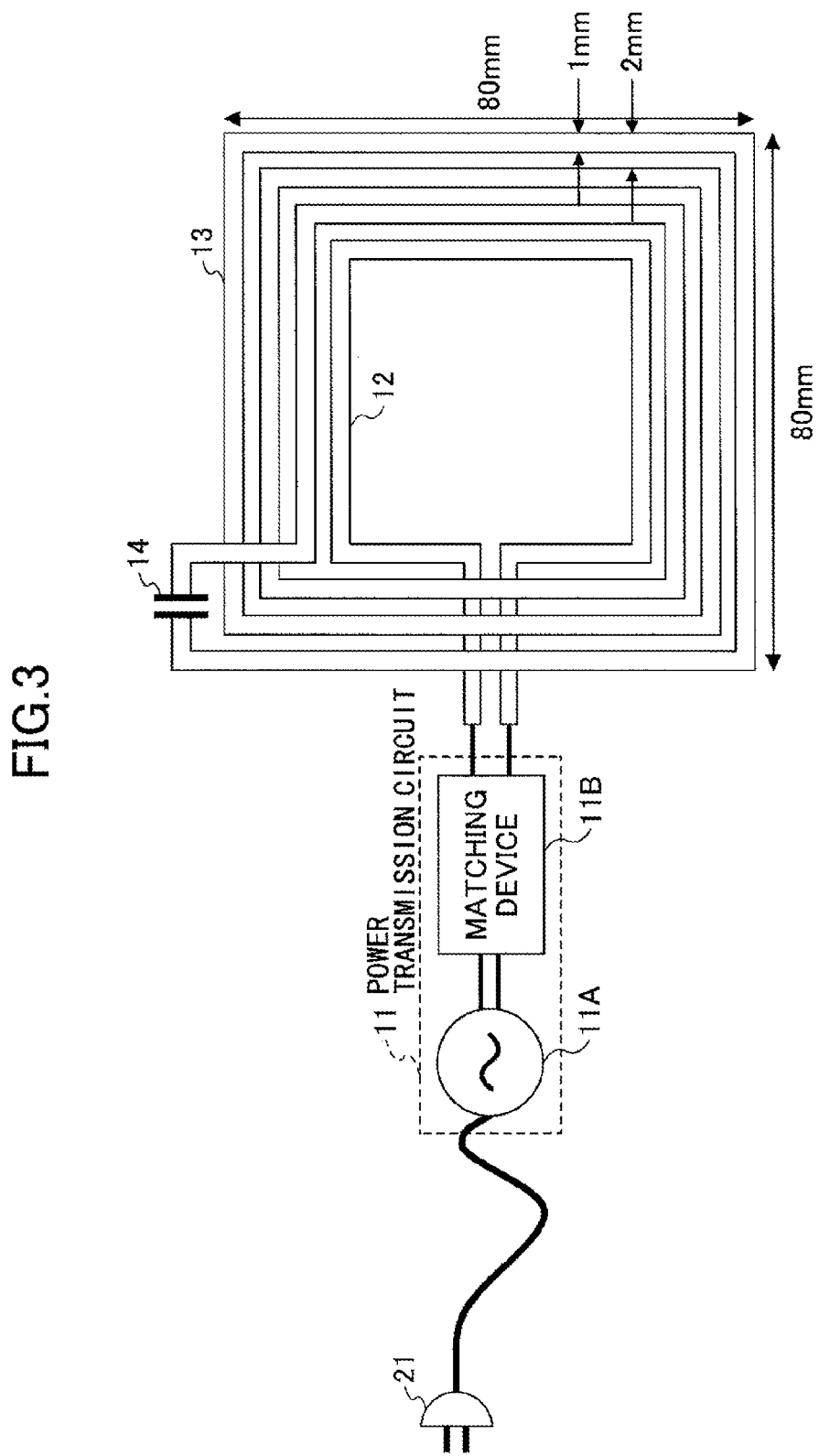
FIG. 3 is a drawing illustrating an example of the configuration of a power transmitter.

FIG. 3 is a drawing illustrating an example of the configuration of the power transmitter 20. The power transmitter 20 includes the power transmission circuit 11, the power transmitting coil 12, the resonance coil 13, and the capacitor 14. The function and operation of each circuit element are as have been described with reference to FIG. 1. The power transmission circuit 11 includes an oscillating circuit 11A and a matching device 11B. The resonance coil 13 is a three-turn coil in which a wire having a diameter of 1 mm forms a three-turn loop with an outer diameter of 80 mm and with 1-mm turn spacing (i.e., at a 2-mm pitch).

Figure 4:
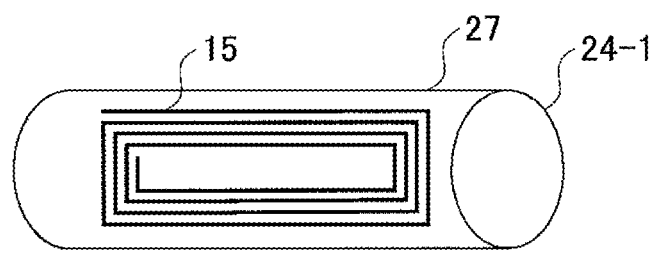
FIG. 4 is a drawing illustrating an example of the placement of a resonance coil in a rechargeable battery.
Figure 5:
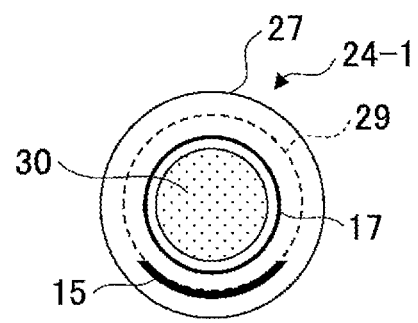
FIG. 5 is a cross-sectional view illustrating a schematic configuration of the cross section of the rechargeable battery.

FIG. 4 is a drawing illustrating an example of the placement of the resonance coil in the rechargeable battery 24-1. FIG. 5 is a cross-sectional view illustrating a schematic configuration of the cross section of the rechargeable battery 24-1. The cross section illustrated in FIG. 5 is taken along a plane perpendicular to the central axis of the cylindrical shape of the rechargeable battery 24-1. The remaining rechargeable batteries 24-2 through 24-5 may have the same or similar configuration as the rechargeable battery 24-1. In FIG. 4, a cylinder side surface 27 of the rechargeable battery 24-1 has the power-receiving-purpose resonance coil 15 disposed therein. The resonance coil 15 corresponds to the resonance coil 15 illustrated in FIG. 1. In reality, the resonance coil 15 is disposed inside the cylinder side surface 27 that forms an outer circumferential surface of the rechargeable battery 24-1.

The rechargeable battery 24-1 includes a rechargeable battery cell 30 that is the main body of the rechargeable battery, and further includes the resonance coil 15, the power receiving coil 17, and the cylinder side surface 27. The rechargeable battery cell 30 has a cylindrical shape. The cylinder side surface 27 has a hollow cylindrical shape in which the rechargeable battery cell 30 is disposed. Here, the cylindrical shape refers to both a hollow shape and a solid cylindrical shape. The rechargeable battery cell 30 is the main body of the battery. The rechargeable battery cell 30 includes a metallic cylindrical case that is filled with chemical substances for providing the electric charge function, and includes positive and negative poles situated at the upper and lower bases of the cylinder, respectively. The power receiving coil 17 is disposed on the cylinder side surface of the rechargeable battery cell 30, and is connected through wires to the power reception circuit (i.e., the power reception circuit 18 illustrated in FIG. 1, for example). The resonance coil 15 is freely movable on the cylinder side surface of the rechargeable battery cell 30 in the circumferential direction around the center axis of the cylindrical shape. Namely, resonance coil 15 is freely movable along the curved surface indicated by a dotted line 29 in FIG. 5. As was previously described, the resonance coil 15 and the power receiving coil 17 may preferably be planar like a spiral coil, and are curved in accordance with the curvature of the cylindrical side surface of the rechargeable battery cell 30 for arrangement inside the rechargeable battery 24-1. Coupling between the power receiving coil 17 and the resonance coil 15 through electromagnetic induction causes the alternating-current power received by the resonance coil 15 to be supplied to the power receiving coil 17. The electric power is then supplied from the power receiving coil 17 to the power reception circuit through wires.

Because of free movement of the resonance coil 15 along the cylindrical side surface, the resonance coil 15 is always situated to face downward due to gravity regardless of the rotational position of the rechargeable battery 24-1. Namely, regardless of the rotational position of the rechargeable battery 24-1, the resonance coil 15 moves to the lowest point on the curved surface indicated by the dotted line 29, and stays at such a position. At the lowest point, the resonance coil 15 faces downward. Here, the direction of the coil refers to the direction of the coil axis. In the case of a spiral coil, the direction of the coil axis is the direction perpendicular, at the center of the coil, to the plane (i.e., curved plane) that includes the spiral coil, and corresponds to the direction of magnetic flux passing the center of the coil in the plane that includes the coil. In the case of a single-winding coil, the direction of the coil axis is the direction perpendicular, at the center of the coil, to the plane (i.e., curved plane) that includes the single-winding coil, and corresponds to the direction of magnetic flux passing the center of the coil in the plane that includes the coil. The rotational position of the rechargeable battery 24-1 refers to the position of the rechargeable battery 24-1 in terms of the rotation thereof (i.e., relating to which point on the cylinder side surface faces upward) when the rechargeable battery 24-1 is laid horizontally on the horizontal plane such that the cylinder side surface of the rechargeable battery 24-1 is in contact with the horizontal plane.

The power receiving coil 17 may alternatively be disposed on (inside) the cylinder side surface 27. Further, the resonance coil 15 may alternatively be construed as being freely movable on the interior of the cylinder side surface 27 in the circumferential direction around the center axis of the cylindrical shape of the rechargeable battery cell 30. In such a case, the power receiving coil 17 may be situated further toward the outside than the curved surface indicated by the dotted line 29 on which the resonance coil 15 is movable.

Figure 6:
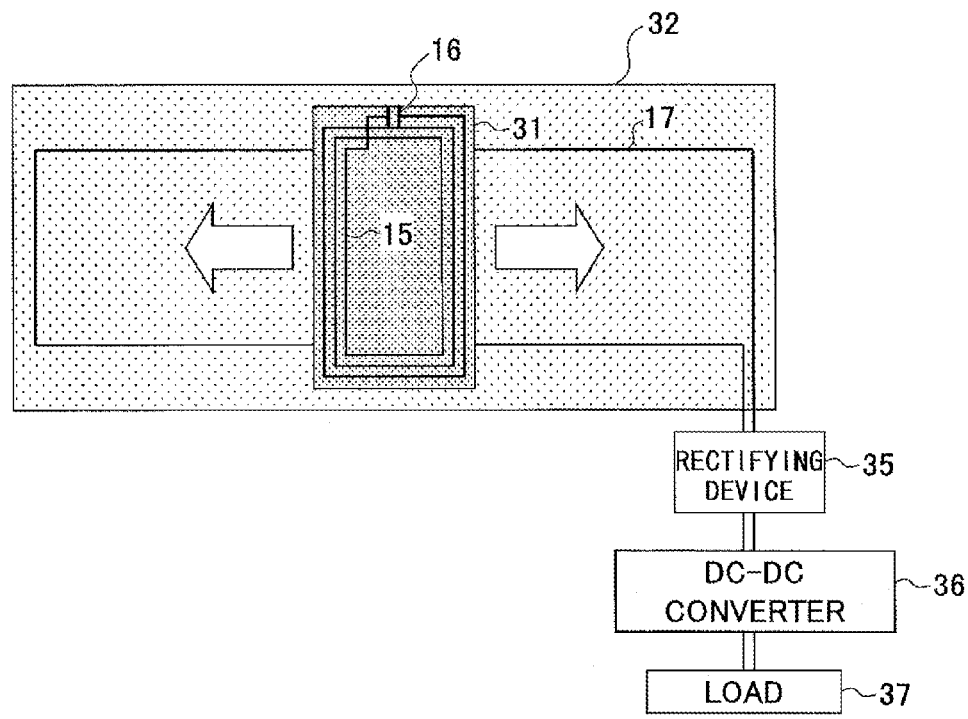
FIG. 6 is a drawing illustrating the positions of the power receiving coil and the resonance coil as viewed with a cylindrical side face expanded into a flat plane for illustrative purposes.

FIG. 6 is a drawing illustrating the positions of the power receiving coil 17 and the resonance coil 15 as viewed with the cylindrical side face expanded into a flat plane for illustrative purposes. In FIG. 6, an expanded cylinder side surface 32 may be the cylinder side surface of the rechargeable battery cell 30 with the outer side thereof facing up in FIG. 6. Alternatively, the expanded cylinder side surface 32 may be the cylinder side surface 27 with the inner side thereof facing up in FIG. 6. The power receiving coil 17 is disposed to cover the entirety of the expanded cylinder side surface 32. The resonance coil 15 and the capacitor 16 are formed on a support plate (i.e., substrate) 31. The support plate 31 is freely movable in the direction indicated by arrows (i.e., in the circumferential direction around the center axis of the cylinder).

Coupling between the power receiving coil 17 and the resonance coil 15 through electromagnetic induction causes the alternating-current power received by the resonance coil 15 to be supplied to the power receiving coil 17. The electric power is then supplied from the power receiving coil 17 to the power reception circuit through wires. The power reception circuit includes a rectifying device 35, a DC-DC converter 36, and a load 37. The rectifying device 35 rectifies alternating-current power supplied from the power receiving coil 17 to generate a direct-current voltage. The DC-DC converter 36 converts the direct-current voltage generated by the rectifying device 35 into a predetermined direct-current voltage. The predetermined direct-current voltage obtained through conversion is applied to the load 37. In this example, the load 37 is the rechargeable battery cell 30. The applied direct-current voltage charges the rechargeable battery cell 30. The fact that the power receiving coil 17 is disposed across the entirety of the expanded cylinder side surface 32 ensures that the power receiving coil 17 and the resonance coil 15 are coupled through electromagnetic induction regardless of the position of the resonance coil 15 (i.e., regardless of the rotational position of the rechargeable battery 24-1). The power reception circuit is situated at proper position inside the rechargeable battery 24-1.

Figure 7:
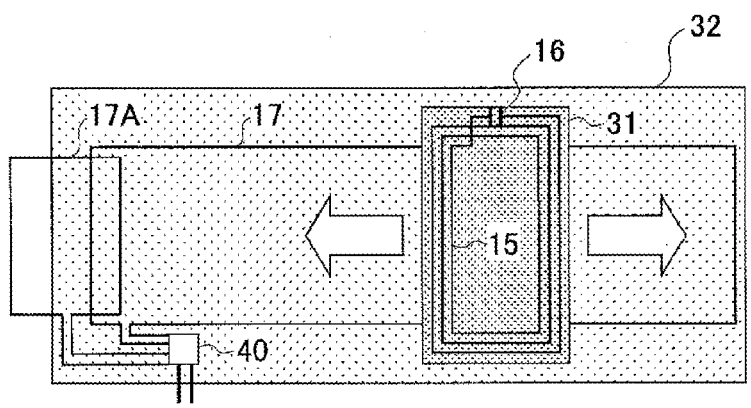
FIG. 7 is a drawing illustrating a variation of the power receiving coil.

FIG. 7 is a drawing illustrating a variation of the power receiving coil. In FIG. 7, the same or corresponding elements as those of FIG. 6 are referred to by the same or corresponding numerals, and a description thereof will be omitted as appropriate. In the configuration illustrated in FIG. 7, a power receiving coil 17A is provided in addition to the power receiving coil 17 illustrated in FIG. 6. Namely, a plurality of coils which partially overlap each other, i.e., the power receiving coil 17 and the power receiving coil 17A, are provided. The state in which a plurality of coils partially overlap each other refers to the state in which these coils are spatially arranged such that part of the magnetic flux existing inside one coil is also in existent inside another coil. The power receiving coil 17 and the power receiving coil 17A are connected to a switch circuit 40. The switch circuit 40 serves to selectively couple one of the plurality of coils to the load 37 (see FIG. 6).

Figure 8:
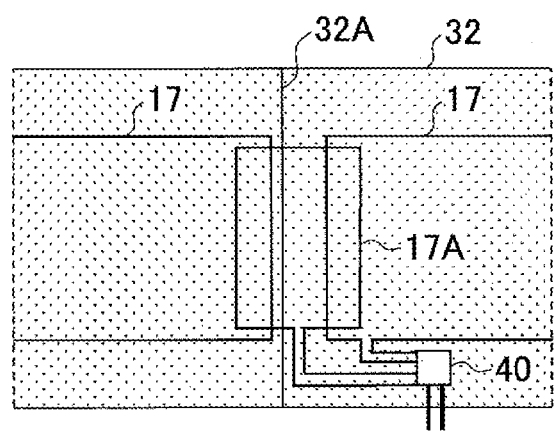
FIG. 8 is a drawing for explaining the technical significance of an added power receiving coil.

FIG. 8 is a drawing for explaining the technical significance of the added power receiving coil 17A. In FIG. 8, part of the expanded cylinder side surface 32 of FIG. 7 is illustrated as having been returned to its unexpanded, original state in which the two opposite edges thereof are joined. A boundary line 32A illustrates the line on which these two opposite edges are joined. As illustrated in FIG. 8, the boundary line 32A is positioned outside the power receiving coil 17. In the case of the resonance coil 15 being situated at the position of the boundary line 32A, electromagnetic induction coupling between the power receiving coil 17 and the resonance coil 15 may not be sufficient, resulting in a failure to receive sufficient power. In consideration of this, the additional power receiving coil 17A is provided to ensure that sufficient power is received through the power receiving coil 17A even when the resonance coil 15 is situated at the position of the boundary line 32A.

Figure 9:
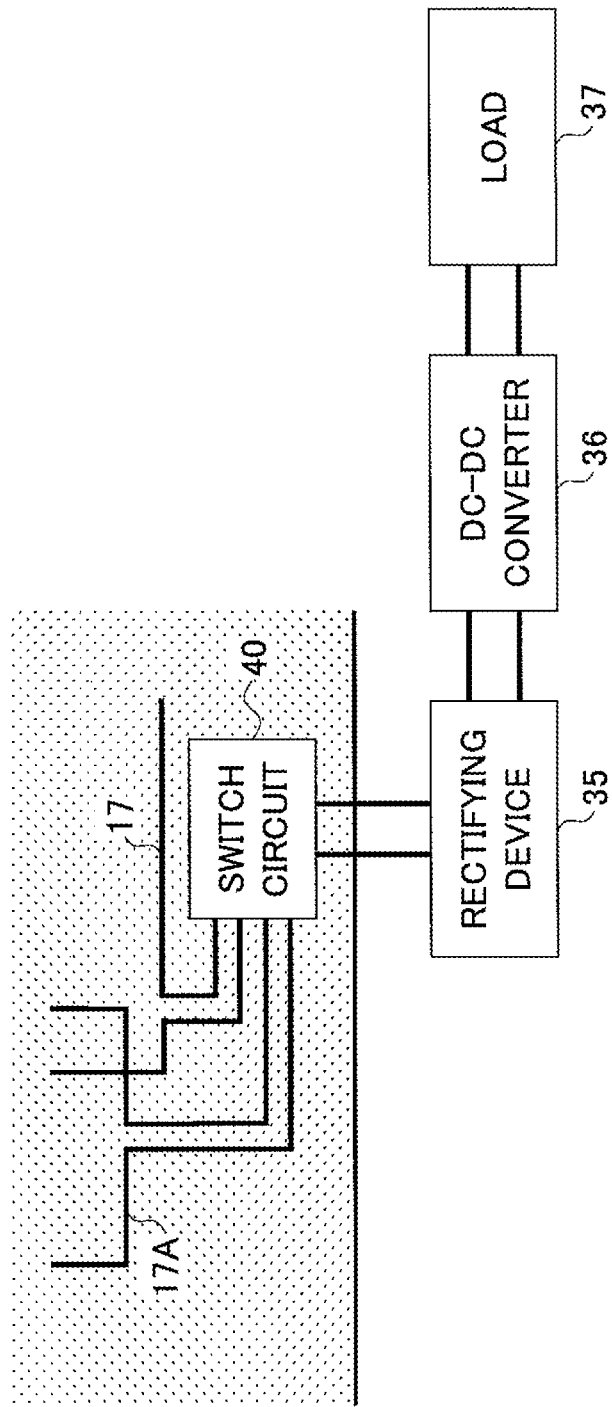
FIG. 9 is a drawing illustrating an example of the configuration of the power receipt circuit inclusive of a switch circuit.

FIG. 9 is a drawing illustrating an example of the configuration of the power receipt circuit inclusive of the switch circuit. In the configuration illustrated in FIG. 9, the power receiving coil 17 and the power receiving coil 17A are connected to the switch circuit 40. The switch circuit 40 selects one of the power receiving coil 17 and the power receiving coil 17A to couple the selected coil to the rectifying device 35. The rectifying device 35 rectifies alternating-current power supplied from the selected power receiving coil to generate a direct-current voltage. The DC-DC converter 36 converts the direct-current voltage generated by the rectifying device 35 into a predetermined direct-current voltage. The predetermined direct-current voltage obtained through conversion is applied to the load 37.

Figure 10:
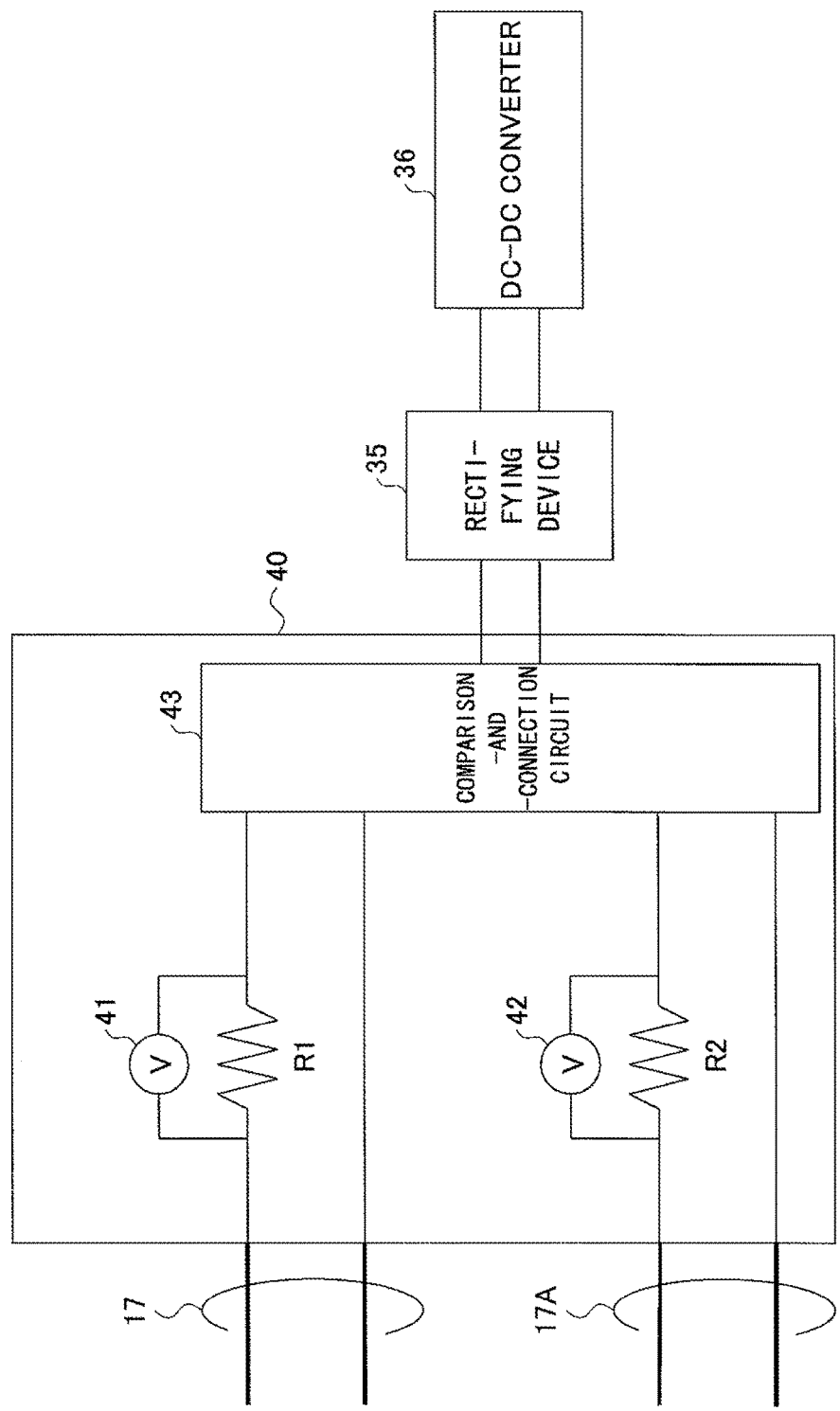
FIG. 10 is a drawing illustrating an example of the configuration of the switch circuit illustrated in FIG. 9.

FIG. 10 is a drawing illustrating an example of the configuration of the switch circuit illustrated in FIG. 9. The switch circuit 40 includes resistor elements R1 and R2, voltmeters 41 and 42, and a comparison-and-connection circuit 43. The resistor elements R1 and R2 and the voltmeters 41 and 42 serve as detection circuits that detect electric powers that are supplied from the power receiving coil 17 and the power receiving coil 17A, respectively. The comparison-and-connection circuit 43 compares the power of the power receiving coil 17 obtained based on the voltage across the resistor element R1 as detected by the voltmeter 41 with the power of the power receiving coil 17A obtained based on the voltage across the resistor element R2 as detected by the voltmeter 42. In response to the result of comparing the detected powers between the coils, the comparison-and-connection circuit 43 selectively connects the coil providing the largest power to the rectifying device 35 (ultimately to the load 37). When the power of the power receiving coil 17 is larger than the power of the power receiving coil 17A, for example, the comparison-and-connection circuit 43 selects the power receiving coil 17 for connection to the rectifying device 35. When the power of the power receiving coil 17A is larger than the power of the power receiving coil 17, on the other hand, the comparison-and-connection circuit 43 selects the power receiving coil 17A for connection to the rectifying device 35.

Figure 11:
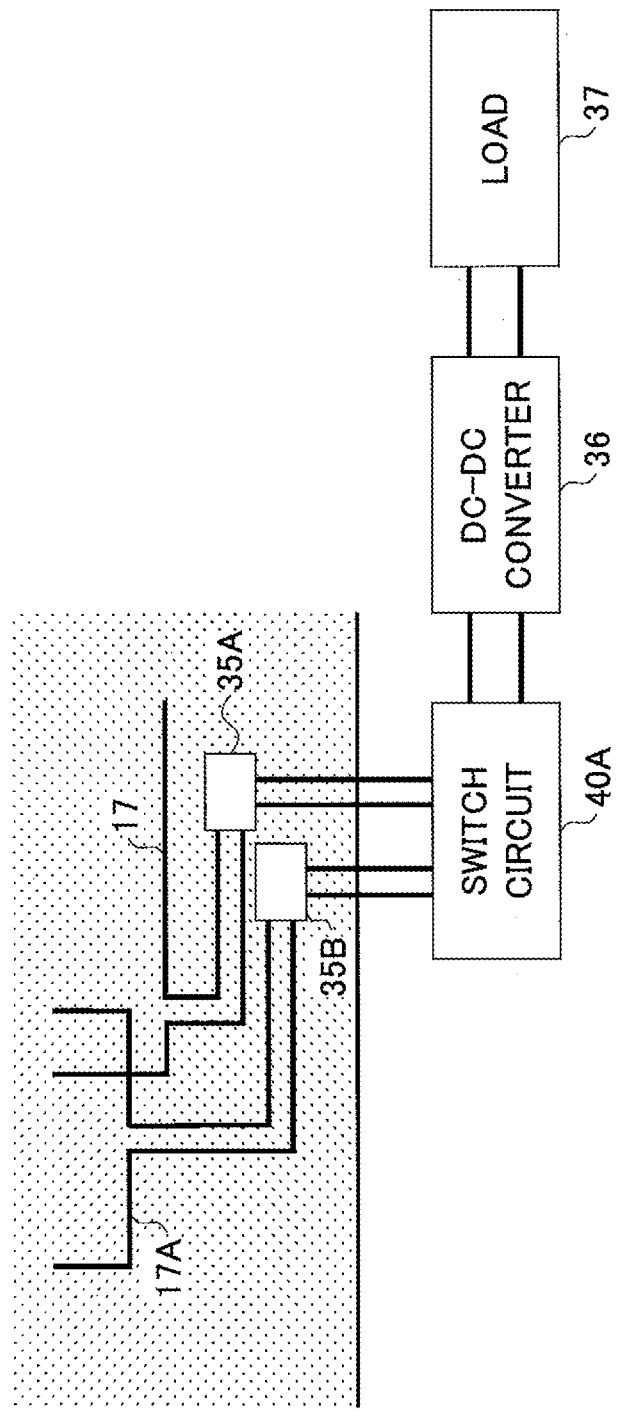
FIG. 11 is a drawing illustrating another example of the configuration of the power receipt circuit inclusive of the switch circuit.

FIG. 11 is a drawing illustrating another example of the configuration of the power receipt circuit inclusive of the switch circuit. In the configuration illustrated in FIG. 11, the power receiving coil 17 is connected to a rectifying device 35A, and the power receiving coil 17A is connected to a rectifying device 35B. The rectifying device 35A rectifies alternating-current power form the power receiving coil 17 to generate a direct-current voltage, and the rectifying device 35B rectifies alternating-current power form the power receiving coil 17A to generate a direct-current voltage. The direct-current voltages generated by the rectifying device 35A and the rectifying device 35B are supplied to a switch circuit 40A. The switch circuit 40A selects one of the direct-current voltages generated by the rectifying device 35A and the rectifying device 35B, and supplies the selected direct-current voltage to the DC-DC converter 36. The DC-DC converter 36 converts the supplied direct-current voltage into a predetermined direct-current voltage. The predetermined direct-current voltage obtained through conversion is applied to the load 37.

Figure 12:
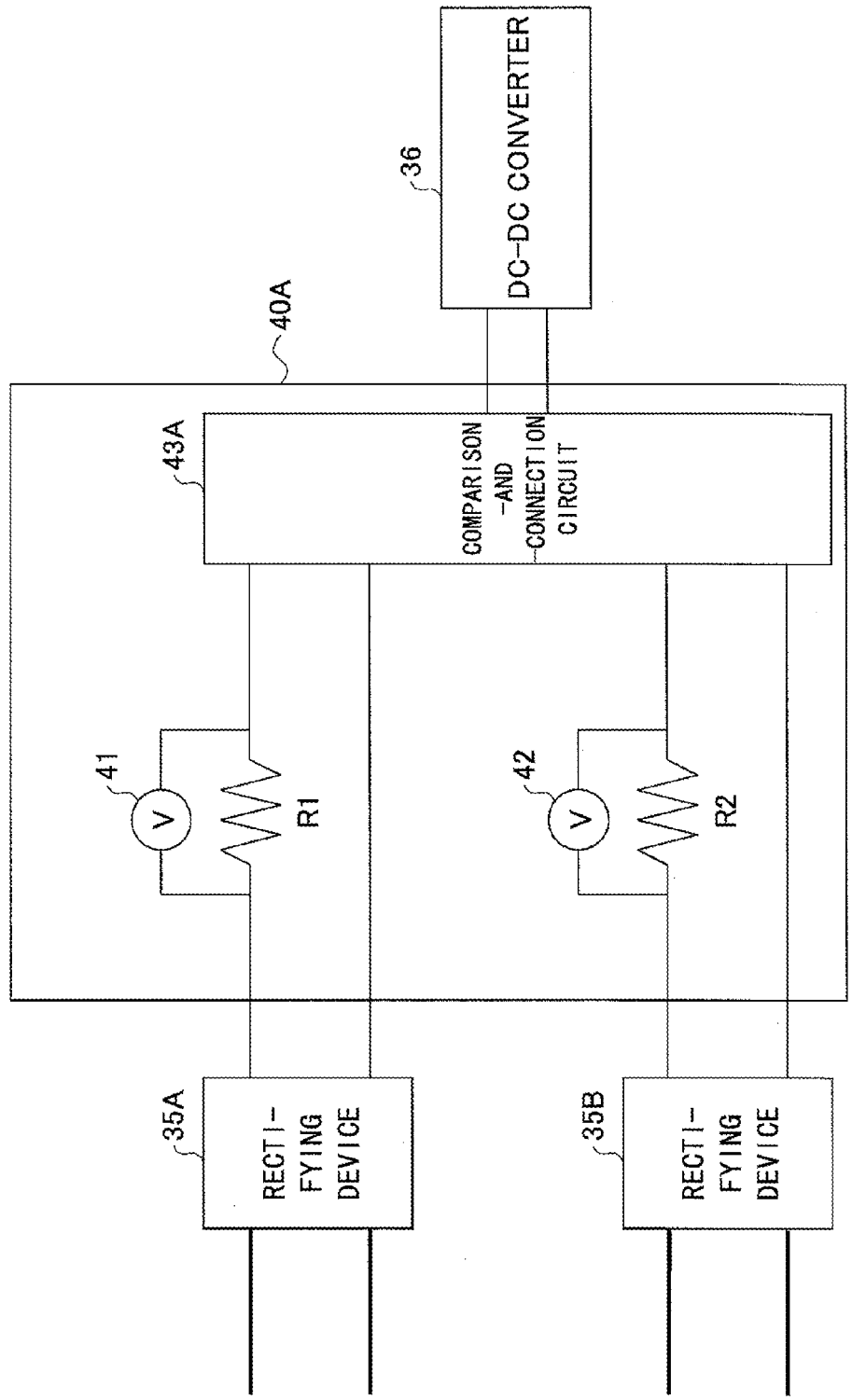
FIG. 12 is a drawing illustrating an example of the configuration of the switch circuit illustrated in FIG. 11.

FIG. 12 is a drawing illustrating an example of the configuration of the switch circuit illustrated in FIG. 11. In FIG. 12, the same or corresponding elements as those of FIG. 11 are referred to by the same or corresponding numerals, and a description thereof will be omitted as appropriate. The switch circuit 40A is substantially the same as or similar to the switch circuit 40 in terms of its operating principle. The fact that the switch circuit 40A detects direct-current powers differs from the case of the switch circuit 40 that detects alternating-current powers. In response to the result of comparing the detected direct-current powers between the coils, a comparison-and-connection circuit 43A selectively connects the output (i.e., rectified direct-current voltage) of the coil providing the largest power to the DC-DC converter 36 (ultimately to the load 37).

Figure 13:
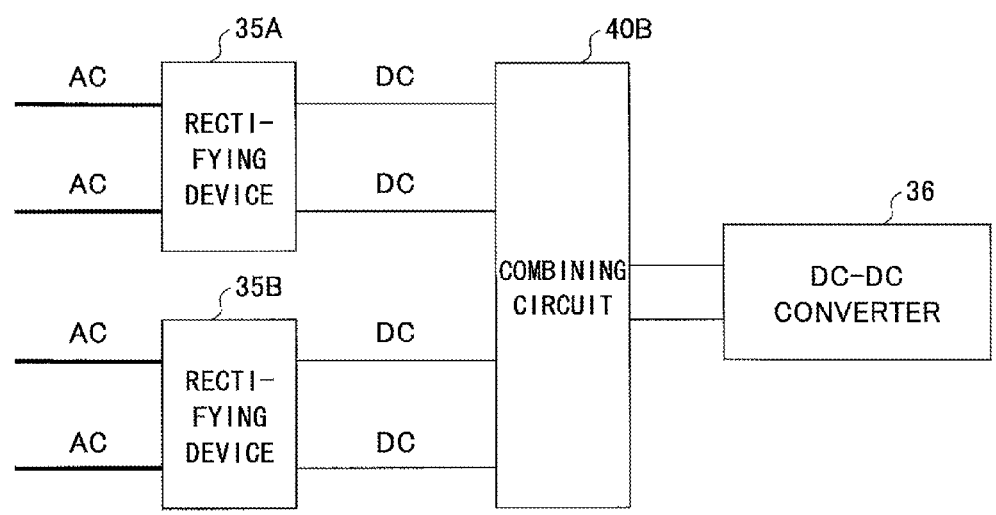
FIG. 13 is a drawing illustrating another example of the configuration of the power reception circuit.

FIG. 13 is a drawing illustrating another example of the configuration of the power reception circuit. In the configuration illustrated in FIG. 13, the switch circuit 40A used in the configuration illustrated in FIG. 12 is replaced with a combining circuit 40B. Other parts of the configuration are the same between FIG. 12 and FIG. 13. Unlike the case of alternating-current voltages, there is no need to take into account phases for respective direct-current voltages generated by the rectifying device 35A and the rectifying device 35B. Instead of selecting the largest voltage, therefore, the total voltage obtained by adding up all the voltages may be supplied to the DC-DC converter 36. The combining circuit 40B adds up the direct-current voltages generated by the rectifying device 35A and the rectifying device 35B to output a direct-current voltage equal to the total sum.

Figure 14:
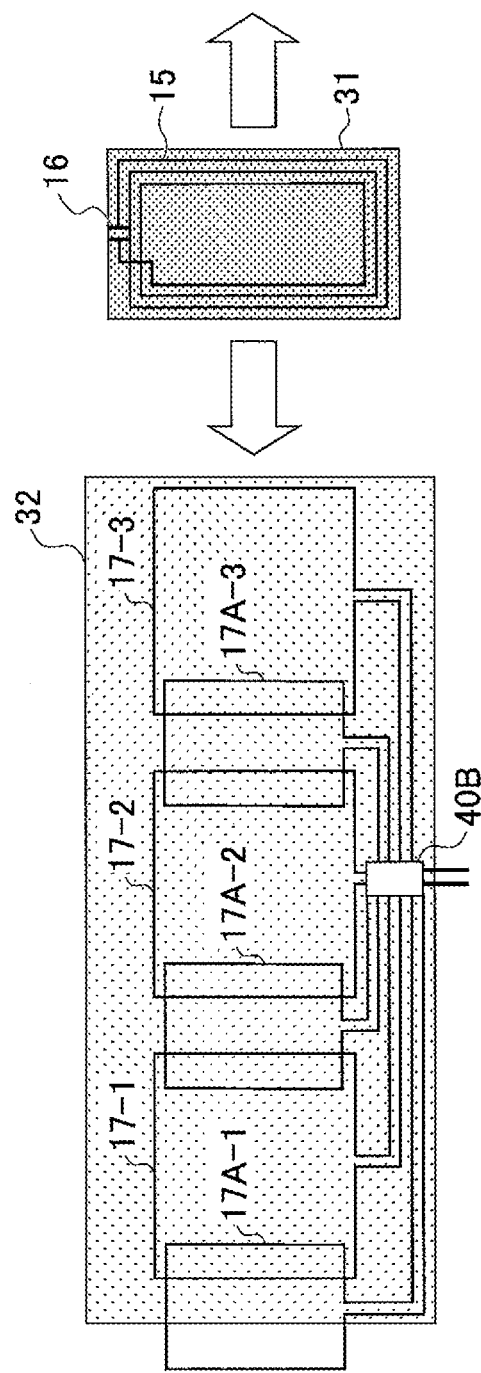
FIG. 14 is a drawing illustrating a further variation of the power receiving coil.

FIG. 14 is a drawing illustrating a further variation of the power receiving coil. In FIG. 14, the same or corresponding elements as those of FIG. 6 and FIG. 7 are referred to by the same or corresponding numerals, and a description thereof will be omitted as appropriate. In the configuration illustrated in FIG. 14, power receiving coils 17-1 through 17-3 and power receiving coils 17A-1 through 17A-3 are provided. Namely, a plurality of coils that partially overlap each other, i.e., the power receiving coils 17-1 through 17-3 and the power receiving coils 17A-1 through 17A-3, are provided. These power receiving coils are connected to the switch circuit 40B. The switch circuit 40B serves to selectively couple one of the plurality of coils to the load 37 (see FIG. 6). The configuration of the switch circuit 40B may be the same as or similar to the switch circuit 40 illustrated in FIG. 10, except for a difference in the number of coils connected to the input side.

As is illustrated in FIG. 14, the lengths of the power receiving coils in the circumferential direction of the cylinder side surface 32 (i.e., the rotation direction around the center axis of the cylinder) are shortened, thereby improving transmission efficiency. This is because a difference in the coil diameter between the coils for power transmission largely affects power transmission efficiency in the case of the resonance coil 15 and the power receiving coils 17-1 through 17-3 and 17A-1 through 17A-3 which are coupled through electromagnetic induction. Specifically, power transmission efficiency becomes maximum when the length of a resonance coil 15 in the circumferential direction and the length of the power receiving coil in the circumferential direction are equal to each other.

Figure 15:
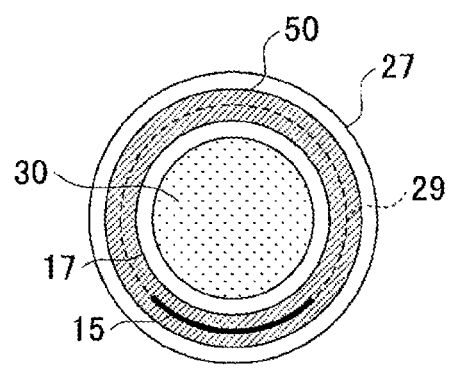
FIG. 15 is a cross-sectional view illustrating the mechanism that allows a resonance coil to move in a cross-section of a rechargeable battery.
Figure 16:
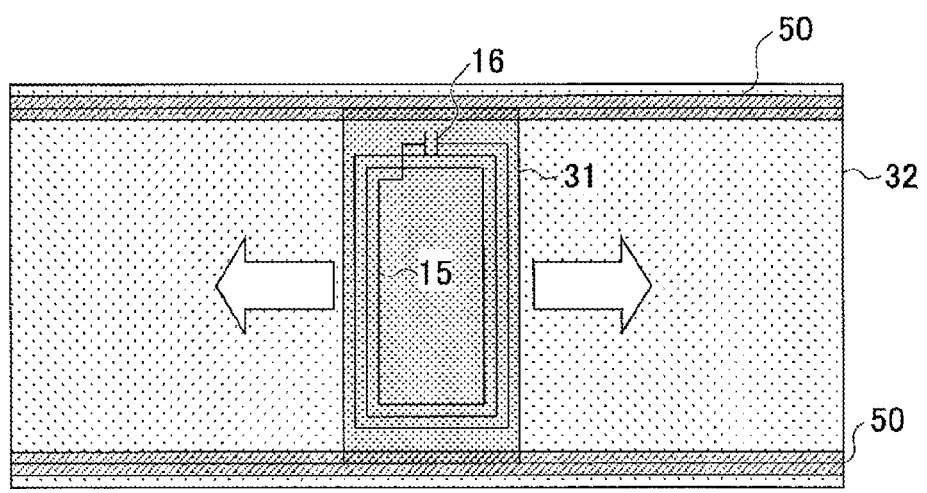
FIG. 16 is a drawing illustrating the mechanism that allows a resonance coil to move as viewed with the cylinder side surface being expanded on a flat plane.

FIG. 15 is a cross-sectional view illustrating the mechanism that allows a resonance coil to move in a cross-section of a rechargeable battery. FIG. 16 is a drawing illustrating the mechanism that allows a resonance coil to move as viewed with the cylinder side surface being expanded on a flat plane. In FIG. 15, the same or corresponding elements as those of FIG. 5 are referred to by the same or corresponding numerals, and a description thereof will be omitted as appropriate. In FIG. 16, the same or corresponding elements as those of FIG. 6 are referred to by the same or corresponding numerals, and a description thereof will be omitted as appropriate.

In FIG. 15, a guide groove 50 is provided to allow the resonance coil 15 to move along the curved surface illustrated by the dotted line 29. As illustrated in FIG. 16, there are two guide grooves 50, one near each of the upper edge and the lower edge of the cylinder side surface 32, and guide the support plate 31 supporting the resonance coil 15 along the cylinder side surface 32. The two guide grooves 50 have the upper end and lower end of the support plate 31 engaged therein, thereby allowing the support plate 31 to move along the cylinder side surface 32 while the support plate 31 is supported by the guide grooves 50. The support plate 31 is in contact with the guide grooves 50 only at the upper end and lower end thereof. This arrangement achieves small friction, thereby providing smooth travel movement.

Figure 17:
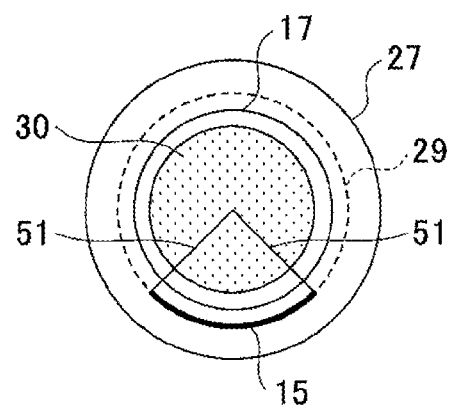
FIG. 17 is a cross-sectional view illustrating another mechanism that allows a resonance coil to move in a cross-section of a rechargeable battery.
Figure 18:
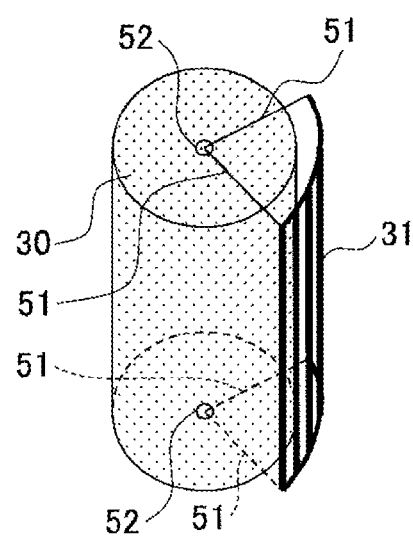
FIG. 18 is an oblique perspective view of a rechargeable battery with the movement mechanism illustrated in FIG. 17.

FIG. 17 is a cross-sectional view illustrating another mechanism that allows a resonance coil to move in a cross-section of a rechargeable battery. FIG. 18 is an oblique perspective view of a rechargeable battery with the movement mechanism illustrated in FIG. 17. In FIG. 17, the same or corresponding elements as those of FIG. 5 are referred to by the same or corresponding numerals, and a description thereof will be omitted as appropriate.

In FIG. 17, support members 51 for supporting the resonance coil 15 are provided to allow the resonance coil 15 to move along the curved surface illustrated by the dotted line 29. The support members 51 extend in radial directions from the center axis of the cylinder to support the resonance coil 15 at the tips thereof. As is illustrated in FIG. 18, pivot members 52 are disposed to support the support members 51 in a rotatable manner on the center axis of the cylinder (i.e., on the center axis of the rechargeable battery cell 30). The two pivot members 52, one on each of the upper and lower bases of the rechargeable battery cell 30, have the support members 51 attached thereto in a rotatable manner. The tips of the support members 51 may have the resonance coil 15 directly attached thereto. Alternatively, the support plate 31 for supporting the resonance coil 15 may be fixedly attached to the tips of the support members 51 as illustrated in FIG. 18.

Figure 19:
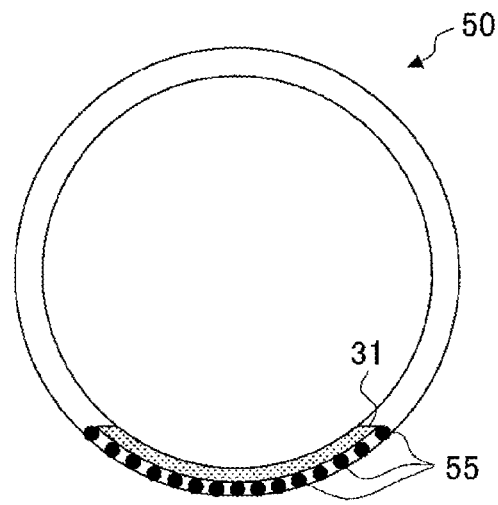
FIG. 19 is a drawing illustrating an example of the movement mechanism that utilizes guide grooves.

FIG. 19 is a drawing illustrating an example of the movement mechanism that utilizes guide grooves. FIG. 19 illustrates the configuration of the movement mechanism as viewed on a cross section that is taken perpendicularly to the center axis of the cylinder of a rechargeable battery. A plurality of balls 55 are provided for each of the upper end and the lower end of the support plate 31 that is engaged in the guide grooves 50. These balls serve to reduce friction based on a similar mechanism to a ball bearing, thereby making it easier for the support plate 31 to move relative to the guide grooves 50. The balls 55 may be provided on the upper and lower ends of the support plate 31, or may be provided on the outer circumference side of the guide grooves 50. When provided on the guide groove side, the balls 55 may be disposed all across the circumference of the guide grooves 50.

Figure 20:
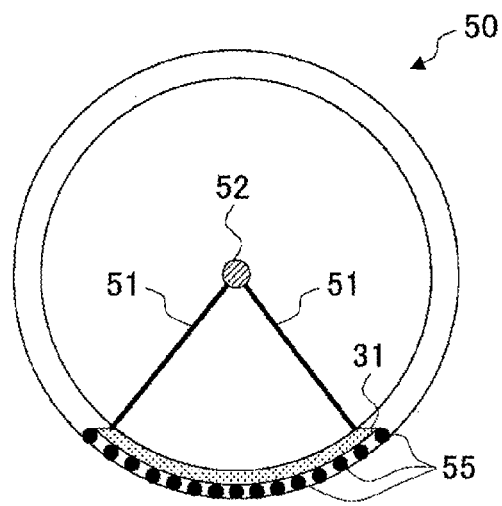
FIG. 20 is a drawing illustrating an example of the movement mechanism that utilizes guide grooves, support members, and pivot members.

FIG. 20 is a drawing illustrating an example of the movement mechanism that utilizes guide grooves 50, the support members 51, and the pivot members 52. FIG. 20 illustrates the configuration of the movement mechanism as viewed on a cross section that is taken perpendicularly to the center axis of the cylinder of a rechargeable battery. A plurality of balls 55 are provided for each of the upper end and the lower end of the support plate 31 that is engaged in the guide grooves 50. These balls serve to reduce friction based on a similar mechanism to a ball bearing, thereby making it easier for the support plate 31 to move relative to the guide grooves 50. Further, the support members 51 extending in radial directions from the pivot members 52 are attached in a rotatable fashion to the pivot members 52, with the support plate 31 fixedly attached to the tips (i.e., distal ends) of the support members 51.

Figure 21:
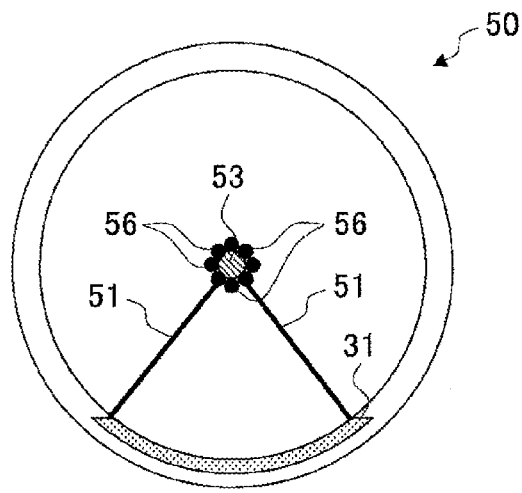
FIG. 21 is a drawing illustrating another example of the movement mechanism that utilizes guide grooves, support members, and pivot members.

FIG. 21 is a drawing illustrating another example of the movement mechanism that utilizes guide grooves 50, the support members 51, and the pivot members 52. FIG. 21 illustrates the configuration of the movement mechanism as viewed on a cross section that is taken perpendicularly to the center axis of the cylinder of a rechargeable battery. The support members 51 attached to a center shaft 53 extend in radial directions from the center shaft 53, with the support plate 31 fixedly attached to the tips (i.e., distal ends) of the support members 51. The balls 55 are disposed around the center shaft 53 to reduce friction by use of a ball bearing mechanism, thereby facilitating smooth rotational movement of the center shaft 53. In this case, the ball bearing portion serves as a support member.

Figure 22:
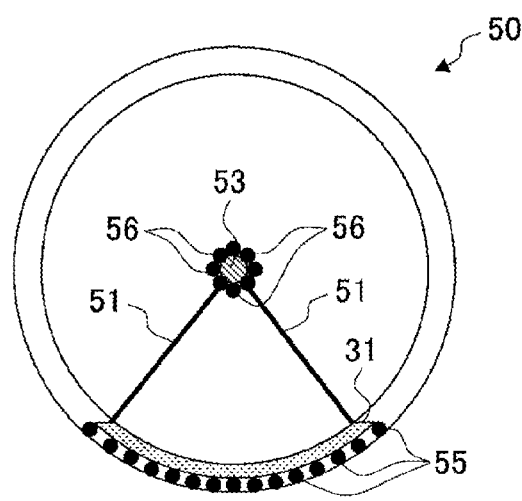
FIG. 22 is a drawing illustrating yet another example of the movement mechanism that utilizes guide grooves, support members, and pivot members.

FIG. 22 is a drawing illustrating yet another example of the movement mechanism that utilizes guide grooves 50, the support members 51, and the pivot members 52. FIG. 22 illustrates the configuration of the movement mechanism as viewed on a cross section that is taken perpendicularly to the center axis of the cylinder of a rechargeable battery. A plurality of balls 55 are provided for each of the upper end and the lower end of the support plate 31 that is engaged in the guide grooves 50. These balls serve to reduce friction based on a similar mechanism to a ball bearing, thereby making it easier for the support plate 31 to move relative to the guide grooves 50. Further, the support members 51 attached to a center axis 53 extend in radial directions from the center axis 53, with the support plate 31 fixedly attached to the tips (i.e., distal ends) of the support members 51. The balls 55 are disposed around the center axis 53 to reduce friction by use of a ball bearing mechanism, thereby facilitating smooth rotational movement around the center axis 53.

Figure 23:
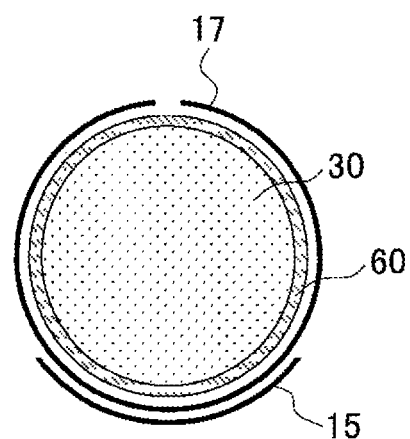
FIG. 23 is a drawing illustrating an example of the placement of a magnetic shield.

FIG. 23 is a drawing illustrating an example of the placement of a magnetic shield. FIG. 23 illustrates the configuration of a cross section that is taken perpendicularly to the center axis of the cylinder of a rechargeable battery. In FIG. 23, the same or corresponding elements as those of FIG. 5 are referred to by the same or corresponding numerals, and a description thereof will be omitted as appropriate. In FIG. 23, elements that are not necessary for the purpose of explaining a magnetic shield are omitted from illustration.

A magnetic shield 60 is disposed between the rechargeable battery cell 30 and each of the power receiving coil 17 and the resonance coil 15. The rechargeable battery cell 30 has metallic materials used therein. Such metal materials may consume some of the energy of an electromagnetic field used for power transmission, resulting in a drop in power transmission efficiency. In order to prevent this, the magnetic shield 60 is disposed between the rechargeable battery cell 30 and each of the power receiving coil 17 and the resonance coil 15. This magnetic shield 60 is composed of a material having large permeability (i.e., the real part of complex permeability) and small magnetic loss (i.e., the imaginary part of complex permeability), so that the magnetic field extends along the magnetic shield 60. The magnetic field thus does not reach the metal materials provided inside the rechargeable battery cell 30, so that power loss is avoided. It may be noted that the power reception circuit (i.e., 18 in FIG. 1) may also be disposed inside the magnetic shield 60.

Figure 24:
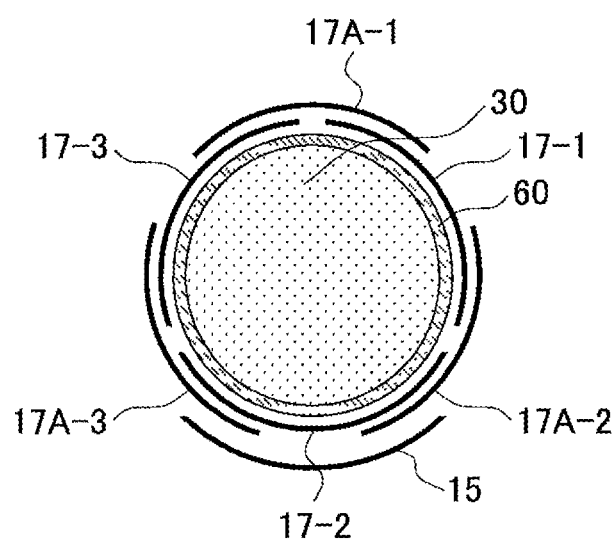
FIG. 24 is a drawing illustrating another example of the placement of a magnetic shield.

FIG. 24 is a drawing illustrating another example of the placement of a magnetic shield. FIG. 23 corresponds to the configuration in which only the power receiving coil 17 is provided as illustrated in FIG. 6. On the other hand, FIG. 24 corresponds to the configuration in which the power receiving coils 17-1 through 17-3 and 17A-1 through 17A-3 are provided as illustrated in FIG. 14. Irrespective of the specific configuration utilized for power receiving coils, the provision of the magnetic shield can shield metallic materials inside the rechargeable battery cell 30 from a magnetic field.

Figure 25:
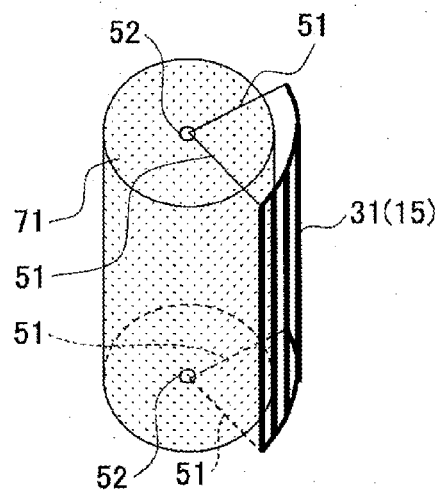
FIG. 25 is a drawing illustrating an example of the configuration of a power receiving unit.

FIG. 25 is a drawing illustrating an example of the configuration of a power receiving unit. In FIG. 25, the same or corresponding elements as those of FIG. 18 are referred to by the same or corresponding numerals, and a description thereof will be omitted as appropriate. In FIG. 25, a power receiving unit 70 includes a cylindrical member 71 made of a non-magnetic insulating body, the support members 51, the pivot members 52, and the support plate 31. The two pivot members 52, one on each of the upper and lower bases of the cylindrical member 71, have the support members 51 attached thereto in a rotatable manner. The support members 51 extend in radial directions from the center axis of the cylinder to support the resonance coil 15 at the tips thereof. The tips of the support members 51 may have the resonance coil 15 directly attached thereto. Alternatively, the support plate 31 for supporting the resonance coil 15 may be fixedly attached to the tips of the support members 51. With this configuration, the support members 51 may be rotated around the center axis of the cylinder to direct the resonance coil 15 supported on the support plate 31 in a desired direction. Although illustration is omitted in FIG. 25, the power receiving coil 17 is disposed on the cylinder side surface of the cylindrical member 71 similarly to the configuration illustrated in FIG. 17 in which the power receiving coil 17 is disposed on the cylinder side surface of the rechargeable battery cell 30.

Figure 26:
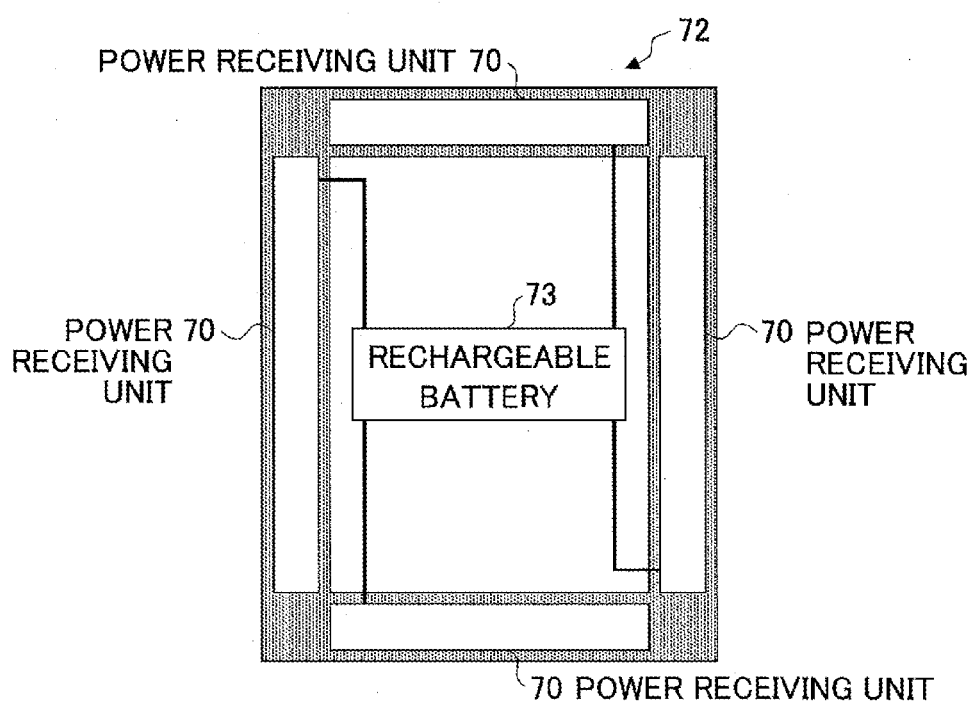
FIG. 26 is a drawing illustrating an example of the configuration of an electronic apparatus utilizing the power receiving unit of FIG. 25.
Figure 27:
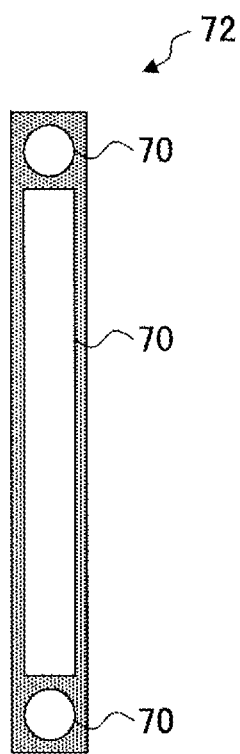
FIG. 27 illustrates the internal configuration of the electronic apparatus of FIG. 26 as viewed from a lateral direction.

FIG. 26 is a drawing illustrating an example of the configuration of an electronic apparatus utilizing the power receiving unit of FIG. 25. FIG. 27 illustrates the internal configuration of the electronic apparatus of FIG. 26 as viewed from a lateral direction. An electronic apparatus 72 illustrated in FIG. 26 and FIG. 27 includes one or more power receiving units 70 and a rechargeable battery 73. Each of the power receiving units 70 has the configuration illustrated in FIG. 25 to supply received electric power to the rechargeable battery 73. With this arrangement, the rechargeable battery 73 of the electronic apparatus 72 is charged. In each of the power receiving units 70, the support members 51 are moved to direct the resonance coil 15 in a desired direction in which the amount of received power becomes maximum, thereby achieving efficient power reception. The power receiving units 70 may have the cylinder center axes thereof aligned in respective, different directions. In the case of the electronic apparatus 72 illustrated in FIG. 26, two power receiving units 70 have the cylinder center axes thereof aligned in the horizontal direction in FIG. 26, and two power receiving units 70 have the cylinder center axes thereof aligned in the vertical direction in FIG. 26. The directions of the resonance coils 15 are adjusted by movement of the support members 51 in the power receiving units 70 that are arranged in respective, different directions. This arrangement makes it possible for the electronic apparatus 72 to efficiently receive power arriving from a power transmitter that may be situated in any given direction.

Figure 28:
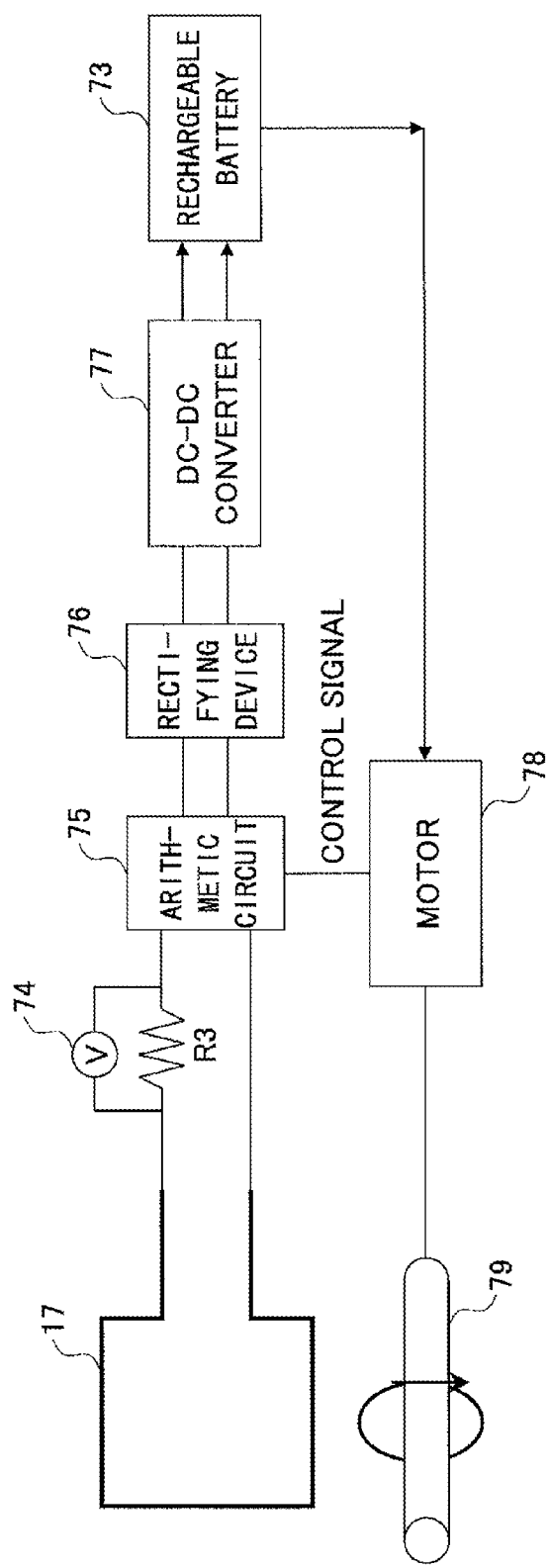
FIG. 28 is a drawing illustrating the mechanism that controls the direction of a resonance coil of the power receiving unit.

FIG. 28 is a drawing illustrating the mechanism that controls the direction of the resonance coil 15 of the power receiving unit 70. In FIG. 28, the alternating-current power received by the power receiving coil 17 of the power receiving unit 70 is supplied to an arithmetic circuit 75 through a resistor element R3 and a voltmeter 74. The arithmetic circuit 75 calculates the received power based on the voltage measured by the voltmeter 74. The arithmetic circuit 75 also supplies the received alternating-current power, as it is, to a rectifying device 76. The rectifying device 76 rectifies the alternating-current power to generate a direct-current voltage. The DC-DC converter 77 converts the direct-current voltage generated by the rectifying device 76 into a predetermined direct-current voltage. The predetermined direct-current voltage obtained through conversion is applied to the rechargeable battery 73.

The arithmetic circuit 75 supplies a control signal responsive to the calculated received power to a motor 78. The motor 78 rotates a rotation shaft 79 in response to the supplied control signal to adjust the rotational angle of the rotation shaft 79. The support members 51 illustrated in FIG. 25 are fixedly mounted on the rotation shaft 79, so that the direction of the resonance coil 15 is adjusted by the adjustment of the rotational angle of the rotation shaft 79. Through this adjustment operation, the arithmetic circuit 75 adjusts the direction of the resonance coil 15 such that the received power becomes maximum.

Figure 29:
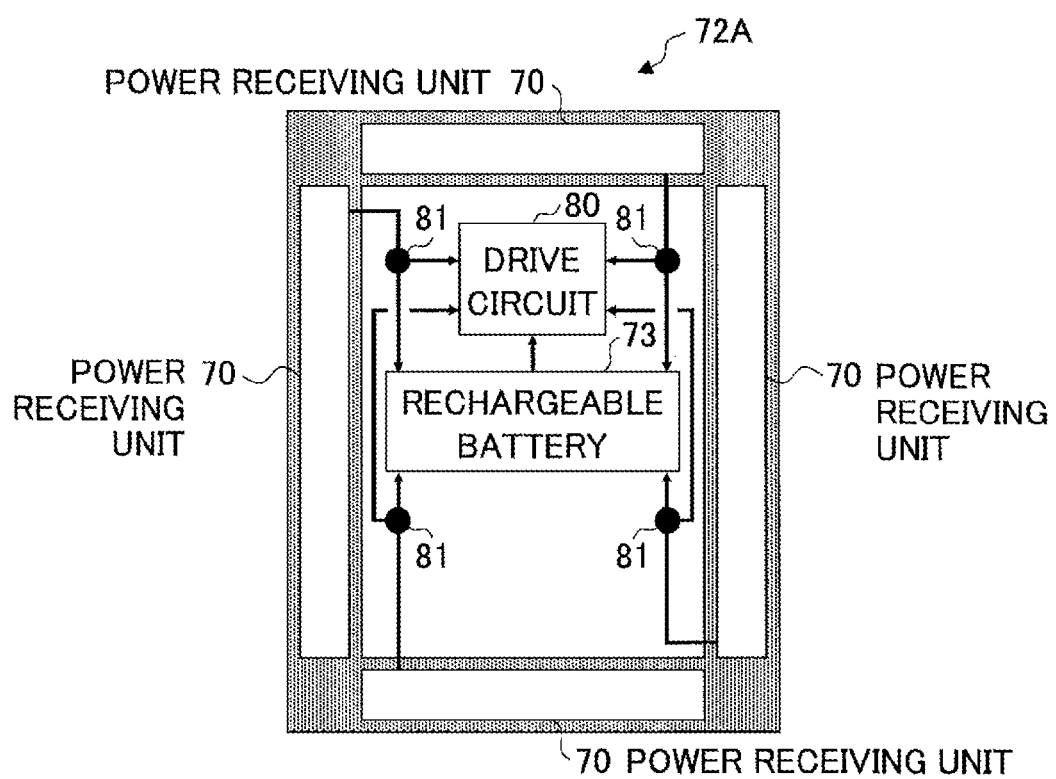
FIG. 29 is a drawing illustrating a variation of the configuration of the electronic apparatus illustrated in FIG. 26.

FIG. 29 is a drawing illustrating a variation of the configuration of the electronic apparatus illustrated in FIG. 26. In FIG. 29, the same or corresponding elements as those of FIG. 26 are referred to by the same or corresponding numerals, and a description thereof will be omitted as appropriate. An electronic apparatus 27A illustrated in FIG. 29 includes a drive circuit 80 and switch circuits 81 in addition to the configuration of the electronic apparatus 72 illustrated in FIG. 26. The drive circuit 80 operates with drive power that is the power supply voltage supplied from the power receiving units 70 and the rechargeable battery 73. The drive circuit 80 operates to provide the functions of the electronic apparatus 72A (e.g., the communication function, the music play function, etc.). In response to the remaining battery level of the rechargeable battery 73, the switch circuits 81 supply the power from the power receiving units 70 only to the drive circuit 80, only to the rechargeable battery 73, or to both the drive circuit 80 and the rechargeable battery 73.

Figure 30:
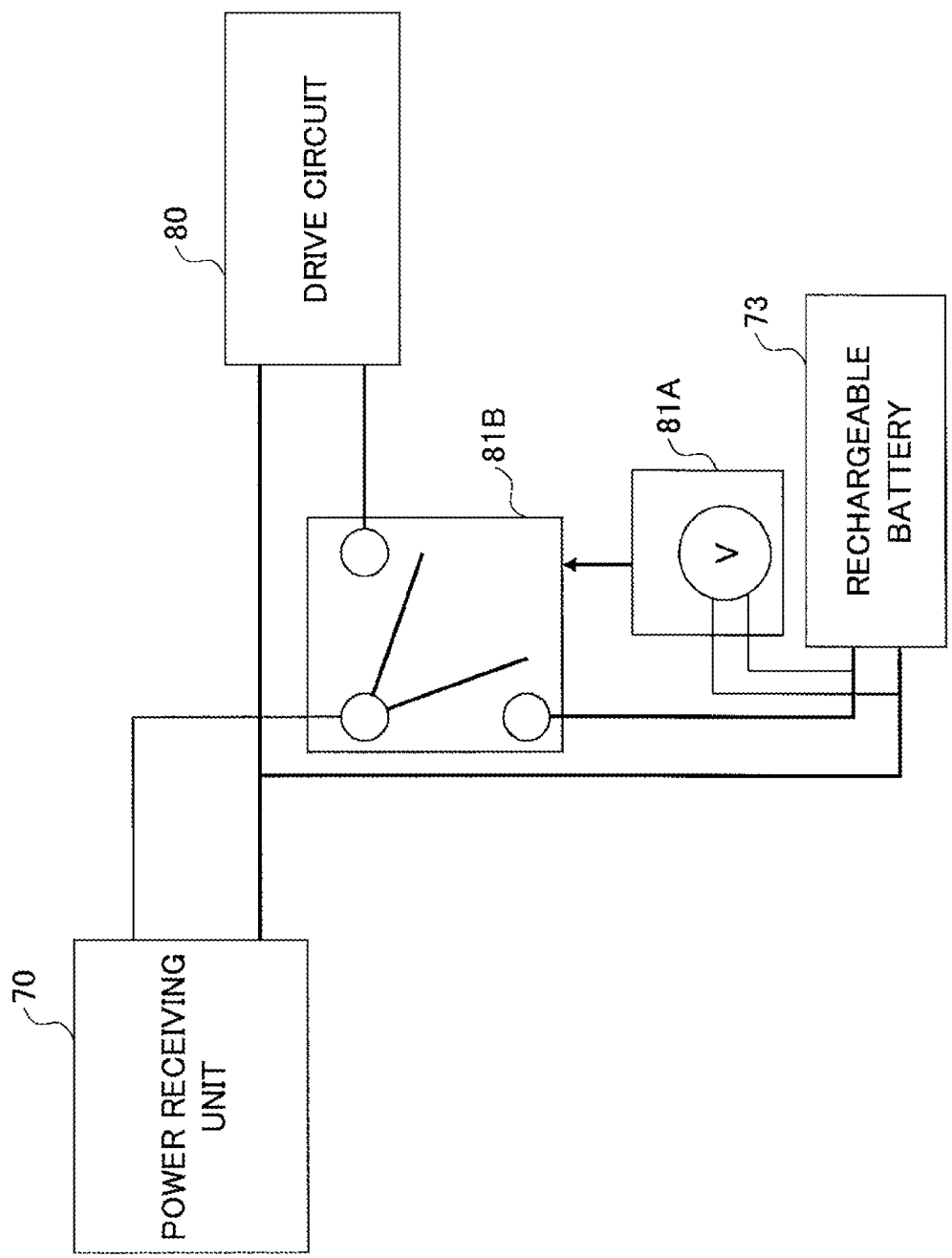
FIG. 30 is a drawing illustrating an example of the configuration that distributes power through a switch circuit.

FIG. 30 is a drawing illustrating an example of the configuration that distributes power through the switch circuit 81. In FIG. 30, a charge-level checking unit 81A and a changeover switch 81B correspond to a given one of the switch circuits 81 illustrated in FIG. 29. Although not expressly illustrated in FIG. 30, a path that supplies drive voltage from the rechargeable battery 73 to the drive circuit 80 is provided. When the power receiving unit 70 is not receiving power, for example, the drive circuit 80 operates with the drive voltage supplied from the rechargeable battery 73. When the power receiving unit 70 is receiving power, the charge-level checking unit 81A checks the battery level based on the voltage between the terminals of the rechargeable battery 73, and, based on the check result, controls the coupling of the changeover switch 81B. In the case of the battery level of the rechargeable battery 73 being less than 20%, for example, the changeover switch 81B is controlled such that all the power from the power receiving unit 70 is supplied to the rechargeable battery 73. In the case of the battery level of the rechargeable battery 73 being more than or equal to 20% and less than 100%, for example, the changeover switch 81B is controlled such that the power from the power receiving unit 70 is supplied to both the rechargeable battery 73 and the drive circuit 80. In the case of the battery level of the rechargeable battery 73 being 100%, for example, the changeover switch 81B is controlled such that all the power from the power receiving unit 70 is supplied to the drive circuit 80.

Figure 31:
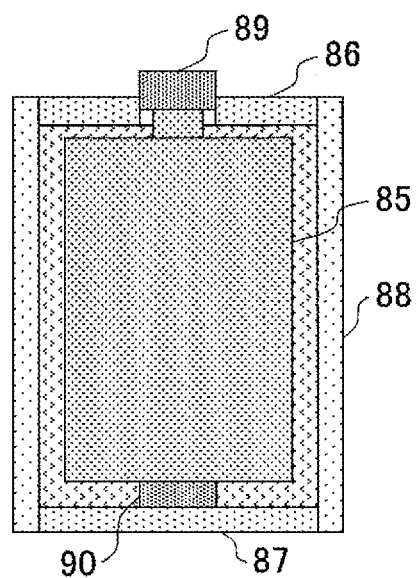
FIG. 31 is a drawing illustrating another example of the configuration of a power receiver for supplying power to a rechargeable battery.

FIG. 31 is a drawing illustrating another example of the configuration of a power receiver for supplying power to a rechargeable battery. In the configuration illustrated in FIG. 31, a case that has a power receiver embedded therein is used to accommodate, in a detachable manner, a conventional rechargeable battery 85 that is commercially available and does not include a power receiver. The case includes a cylinder side surface 88, an upper base 86, a lower base 87, a positive pole terminal 89, and a negative pole terminal 90. With the rechargeable battery 85 stored in the case, the positive pole of the rechargeable battery 85 is in contact with the positive pole terminal 89 of the case, and the negative pole of the rechargeable battery 85 is in contact with the negative pole terminal 90 of the case.

In order to insert and eject the rechargeable battery 85 into and from the case, the lower base 87, for example, may be configured to serve as a lid that can be opened and closed. In this case, the lower base 87 is opened to insert the rechargeable battery 85 into the case, and, then, the lower base 87 is closed to enable use as a charger. The case in which the rechargeable battery 85 is stored may be laid on the flat plane surface of the power transmitter 20 similarly to the rechargeable battery 24-1 illustrated in FIG. 2, for example. With this arrangement, power is transmitted from the power transmitter to the power receiver embedded in the case, thereby charging the rechargeable battery 85.

Figure 32:
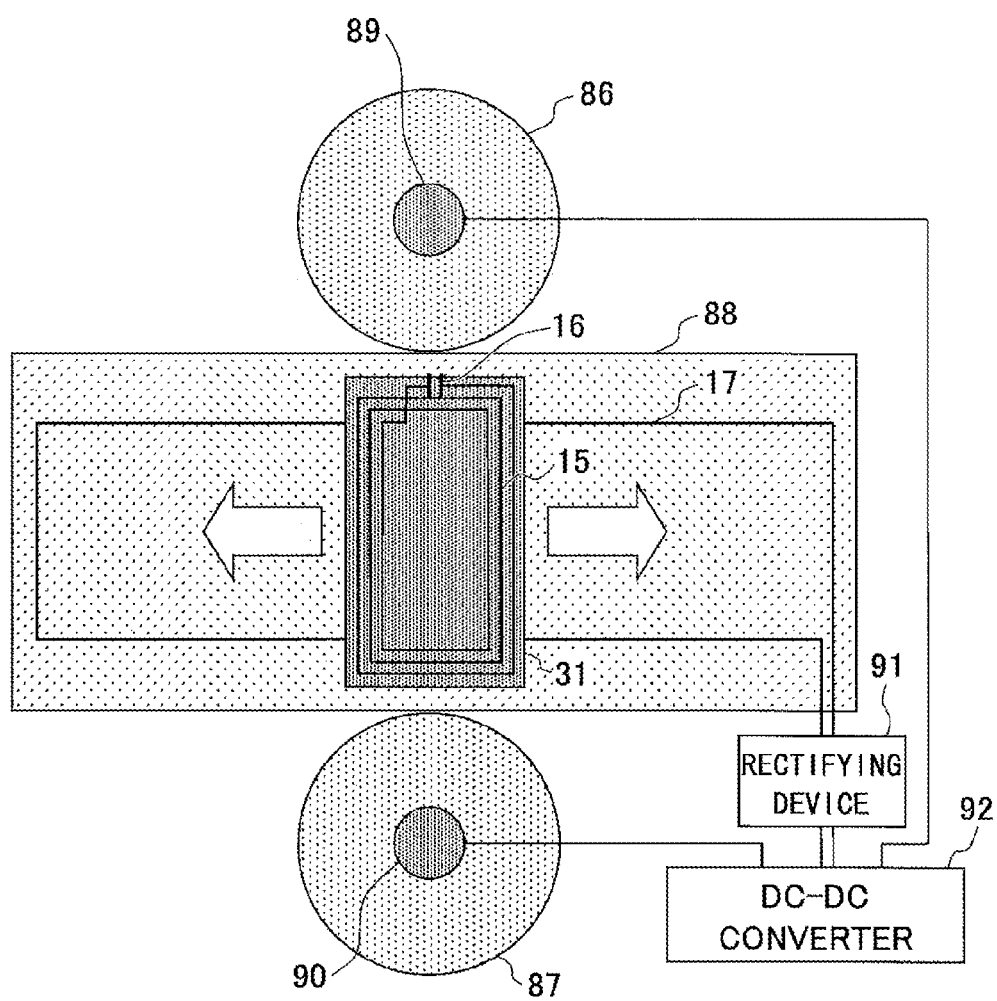
FIG. 32 is a drawing illustrating an expanded view of the case illustrated in FIG. 31.

FIG. 32 is a drawing illustrating an expanded view of the case illustrated in FIG. 31. The case includes the cylinder side surface 88, the upper base 86, the lower base 87, the positive pole terminal 89, and the negative pole terminal 90, and further includes the power receiving coil 17, the support plate 31 having the resonance coil 15 and the capacitor 16 mounted thereon, a rectifying device 91, and a DC-DC converter 92. The power receiving coil 17 is disposed to cover the entirety of the inner side of the cylinder side surface 88. The resonance coil 15 and the capacitor 16 are formed on the support plate (i.e., substrate) 31. The support plate 31 is freely movable in the direction indicated by arrows (i.e., in the circumferential direction around the center axis of the cylinder).

Because of free movement of the resonance coil 15 along the inner side of the cylindrical side surface 88, the resonance coil 15 is always situated to face downward due to gravity regardless of the rotational position of the case. Namely, irrespective of the rotational position of the case, the resonance coil 15 moves to the lowest point and stays at such a point. At the lowest point, the resonance coil 15 faces downward.

Coupling between the power receiving coil 17 and the resonance coil 15 through electromagnetic induction causes the alternating-current power received by the resonance coil 15 to be supplied to the power receiving coil 17. The electric power is then supplied from the power receiving coil 17 to the rectifying device 91 through wires. The rectifying device 91 rectifies alternating-current power supplied from the power receiving coil 17 to generate a direct-current voltage. The DC-DC converter 92 converts the direct-current voltage generated by the rectifying device 91 into a predetermined direct-current voltage. The direct-current voltage obtained through conversion is supplied through the positive pole terminal 89 and the negative pole terminal 90 to the rechargeable battery 85 stored inside the case. The fact that the power receiving coil 17 is disposed across the entirety of the inner side of the cylinder side surface 88 ensures that the power receiving coil 17 and the resonance coil 15 are coupled through electromagnetic induction regardless of the position of the resonance coil 15 (i.e., regardless of the rotational position of the case). The rectifying device 91 and the DC-DC converter 92 may be disposed inside the lower base 87 or on the lower base 87, for example. Further, in the case illustrated in FIG. 32, the receiving coil configuration may be the configuration in which a plurality of power receiving coils are arranged as illustrated in FIG. 7 or FIG. 14, for example.

Figure 33:
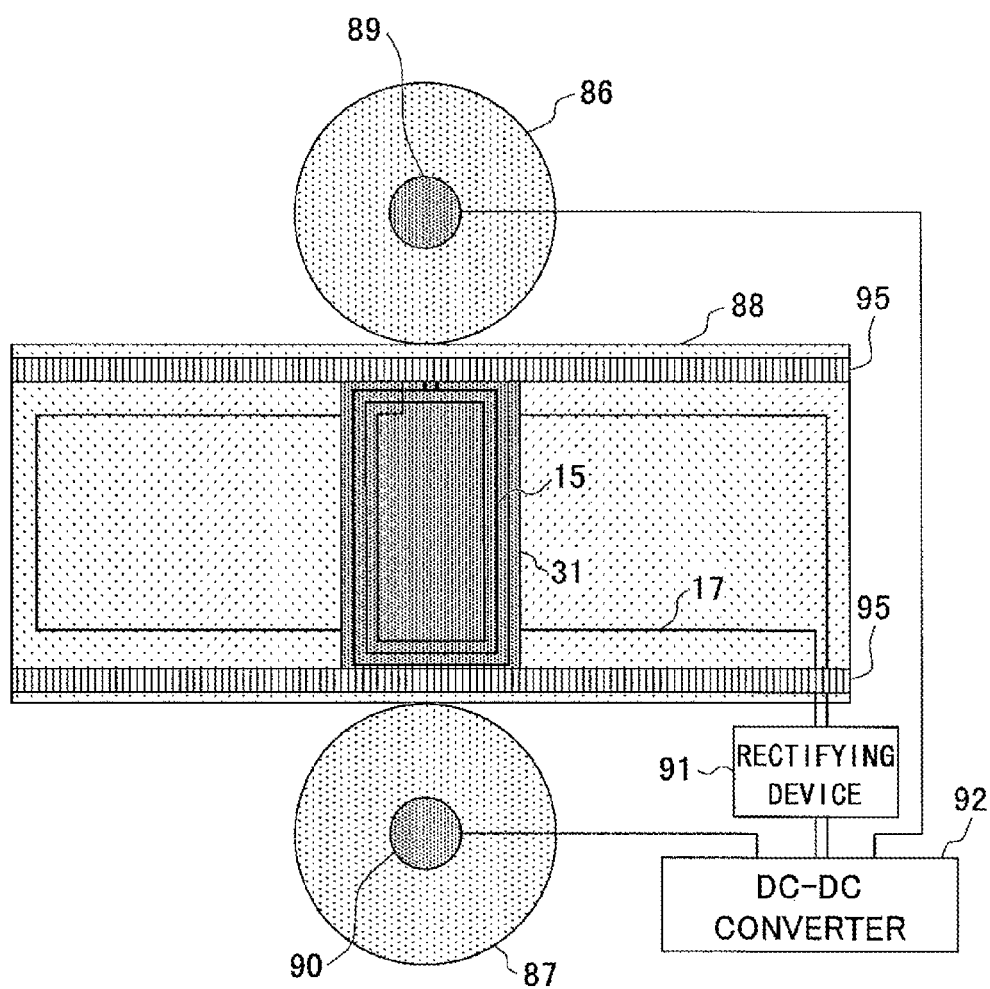
FIG. 33 is a drawing illustrating the mechanism that allows a resonance coil to move in the case illustrated in FIG. 32.

FIG. 33 is a drawing illustrating the mechanism that allows a resonance coil to move in the case illustrated in FIG. 32. In FIG. 33, the same or corresponding elements as those of FIG. 32 are referred to by the same or corresponding numerals, and a description thereof will be omitted as appropriate.

In order to allow the resonance coil 15 to move along the inner wall of the cylinder side surface 88, guide grooves 95 are provided. More specifically, there are two guide grooves 95, one near each of the upper edge and the lower edge of the cylinder side surface 88, and guide the support plate 31 supporting the resonance coil 15 along the inner wall of the cylinder side surface 88. The two guide grooves 95 have the upper end and lower end of the support plate 31 engaged therein, thereby allowing the support plate 31 to move along the inner wall of the cylinder side surface 88 while the support plate 31 is supported by the guide grooves 95. The support plate 31 is in contact with the guide grooves 95 only at the upper end and lower end thereof. This arrangement achieves small friction, thereby providing smooth travel movement.

According to at least one embodiment, a resonance coil on the power reception side is freely movable along the cylinder side surface, so that the resonance coil on the power reception side can be directed in a proper direction. Further, the resonance coil is coupled through electromagnetic induction to a power receiving coil connected to a power reception circuit via wires. This arrangement allows the movable resonance coil to be free from electrical wire connections, thereby ensuring smooth movement.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

What is claimed is:

1. A power receiving apparatus, comprising:
    a power reception circuit;
    a first member having a cylindrical shape;
    a power receiving coil disposed on a cylinder side surface of the first member and connected through wires to the power reception circuit; and
    a resonance coil configured to be freely movable along the cylinder side surface in a circumferential direction around a cylinder center axis of the first member,
    wherein the power receiving coil and the resonance coil are coupled to each other through electromagnetic induction.

2. The power receiving apparatus as claimed in claim 1, wherein a plurality of coils that partially overlap each other are provided as the power receiving coil, and wherein the power reception circuit includes:
    a load; and
    a switch circuit configured to selectively connect one of the coils to the load.

3. The power receiving apparatus as claimed in claim 2, wherein the switch circuit includes:
    a detection circuit configured to detect powers supplied from the coils, respectively; and
    a comparison-and-connection circuit configured to compare the powers detected by the detection circuit between the coils, and to selectively connect an output of a coil providing a largest power to the load in response to a result of the comparison.

4. The power receiving apparatus as claimed in claim 1, further comprising a second member having a hollow cylindrical shape in which the first member is accommodated, wherein the first member is a rechargeable battery cell, and the power receiving coil and the resonance coil are disposed between the second member and the rechargeable battery cell.

5. The power receiving apparatus as claimed in claim 1, further comprising a magnetic shield disposed between the first member and each of the power receiving coil and the resonance coil.

6. The power receiving apparatus as claimed in claim 1, further comprising:
    a support member configured to extend in a radial direction from the cylinder center axis and to support the resonance coil at a distal end thereof; and
    a pivot member configured to support the support member in a rotatable manner around the cylinder center axis.

7. The power receiving apparatus as claimed in claim 1, further comprising:
    a support plate configured to support the resonance coil; and
    guide grooves configured to guide the support plate along the cylinder side surface.

8. The power receiving apparatus as claimed in claim 1, wherein the first member is a hollow cylinder, and the power receiving coil is disposed on an inner wall of the cylinder side surface of the first member, and wherein the resonance coil is configured to be freely movable along the inner wall of the cylinder side surface.

9. The power receiving apparatus as claimed in claim 8, wherein the first member is configured to accommodate therein a cylindrical rechargeable battery in a detachable manner.

10. A power transmission system, comprising:
    a power transmitting apparatus; and a power receiving apparatus configured to receive power from the power transmitting apparatus via magnetic resonance,
wherein the power receiving apparatus includes:
a power reception circuit;
a first member having a cylindrical shape;
a power receiving coil disposed on a cylinder side surface of the first member and connected through wires to the power reception circuit; and
a resonance coil configured to be freely movable along the cylinder side surface in a circumferential direction around a cylinder center axis of the first member,
wherein the power receiving coil and the resonance coil are coupled to each other through electromagnetic induction.

* * * * *